US010739376B2

(12) United States Patent
Isobe et al.

(10) Patent No.: US 10,739,376 B2
(45) Date of Patent: Aug. 11, 2020

(54) ACCELERATION SENSOR

(71) Applicant: Hitachi, Ltd., Chiyoda-ku, Tokyo (JP)

(72) Inventors: Atsushi Isobe, Tokyo (JP); Takashi Shiota, Tokyo (JP); Yuudai Kamada, Tokyo (JP); Chisaki Takubo, Tokyo (JP); Noriyuki Sakuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 15/758,188

(22) PCT Filed: Sep. 15, 2015

(86) PCT No.: PCT/JP2015/076128
§ 371 (c)(1),
(2) Date: Mar. 7, 2018

(87) PCT Pub. No.: WO2017/046866
PCT Pub. Date: Mar. 23, 2017

(65) Prior Publication Data
US 2018/0252745 A1    Sep. 6, 2018

(51) Int. Cl.
*G01P 15/125* (2006.01)
*G01P 15/08* (2006.01)
*G01P 15/18* (2013.01)

(52) U.S. Cl.
CPC ........ *G01P 15/125* (2013.01); *G01P 15/0802* (2013.01); *G01P 15/18* (2013.01); *G01P 2015/084* (2013.01); *G01P 2015/0831* (2013.01)

(58) Field of Classification Search
CPC ..... G01P 15/125; G01P 15/0802; G01P 15/18
See application file for complete search history.

(56) References Cited

U.S. PATENT DOCUMENTS

| 2009/0031809 A1* | 2/2009 | Lin ........................ G01P 15/125 73/514.32 |
| 2010/0024553 A1* | 2/2010 | Classen ............... G01P 15/0802 73/514.32 |

(Continued)

FOREIGN PATENT DOCUMENTS

| JP | 2009-537803 A | 10/2009 |
| JP | 2012-88120 A | 5/2012 |

(Continued)

OTHER PUBLICATIONS

International Search Report (PCT/ISA/210) issued in PCT Application No. PCT/JP2015/076128 dated Dec. 22, 2015 with English-language translation (five (5) pages).

(Continued)

*Primary Examiner* — Helen C Kwok
(74) *Attorney, Agent, or Firm* — Crowell & Moring LLP

(57) ABSTRACT

There is provided an acceleration sensor with low noise and high sensitivity. Specifically, a first number of opening portions are formed in a region corresponding to a heavyweight section of a mass body, on a surface of a membrane layer, and a second number of opening portions are formed in a region corresponding to the heavyweight section of the mass body, on a back surface of the membrane layer. The opening portion and the opening portion are connected to each other to form a plurality of through portions on the membrane layer, and the first number is larger than the second number.

13 Claims, 23 Drawing Sheets

(56) References Cited

U.S. PATENT DOCUMENTS

| | | | | |
|---|---|---|---|---|
| 2010/0122578 A1* | 5/2010 | Classen | ............... | G01P 15/0802 |
| | | | | 73/514.32 |
| 2011/0056297 A1* | 3/2011 | Classen | ................ | G01P 15/125 |
| | | | | 73/514.32 |
| 2013/0167641 A1* | 7/2013 | Heller | ................ | G01P 15/0802 |
| | | | | 73/514.01 |
| 2013/0263662 A1* | 10/2013 | Tanaka | .................... | G01P 1/003 |
| | | | | 73/504.12 |
| 2015/0198493 A1* | 7/2015 | Kaelberer | ........... | G01P 15/0802 |
| | | | | 73/718 |
| 2016/0313462 A1* | 10/2016 | Ullrich | ................... | G01V 1/162 |
| 2017/0356929 A1* | 12/2017 | Zheng | ................... | G01P 15/125 |

FOREIGN PATENT DOCUMENTS

| JP | 2013-140148 A | 7/2013 |
|---|---|---|
| JP | 2013-217721 A | 10/2013 |
| JP | 2014-149234 A | 8/2014 |

OTHER PUBLICATIONS

Japanese-language Written Opinion (PCT/ISA/237) issued in PCT Application No. PCT/JP2015/076128 dated Dec. 22, 2015 (four (4) pages).
Extended European Search Report issued in counterpart European Application No. 15904055.9 dated Feb. 14, 2019 (six (6) pages).

* cited by examiner

[Fig. 1]
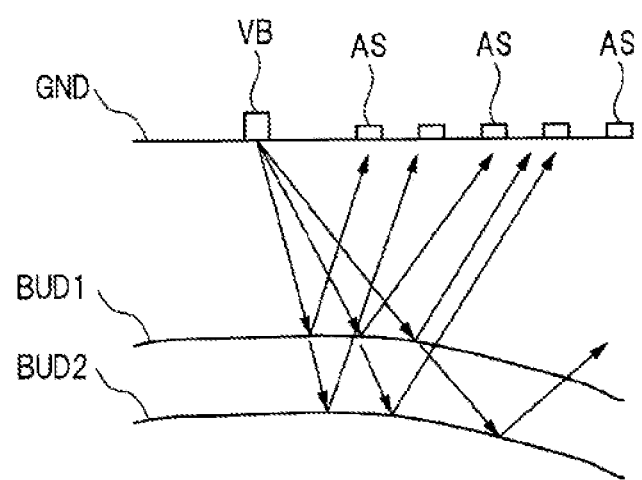

[Fig. 2]
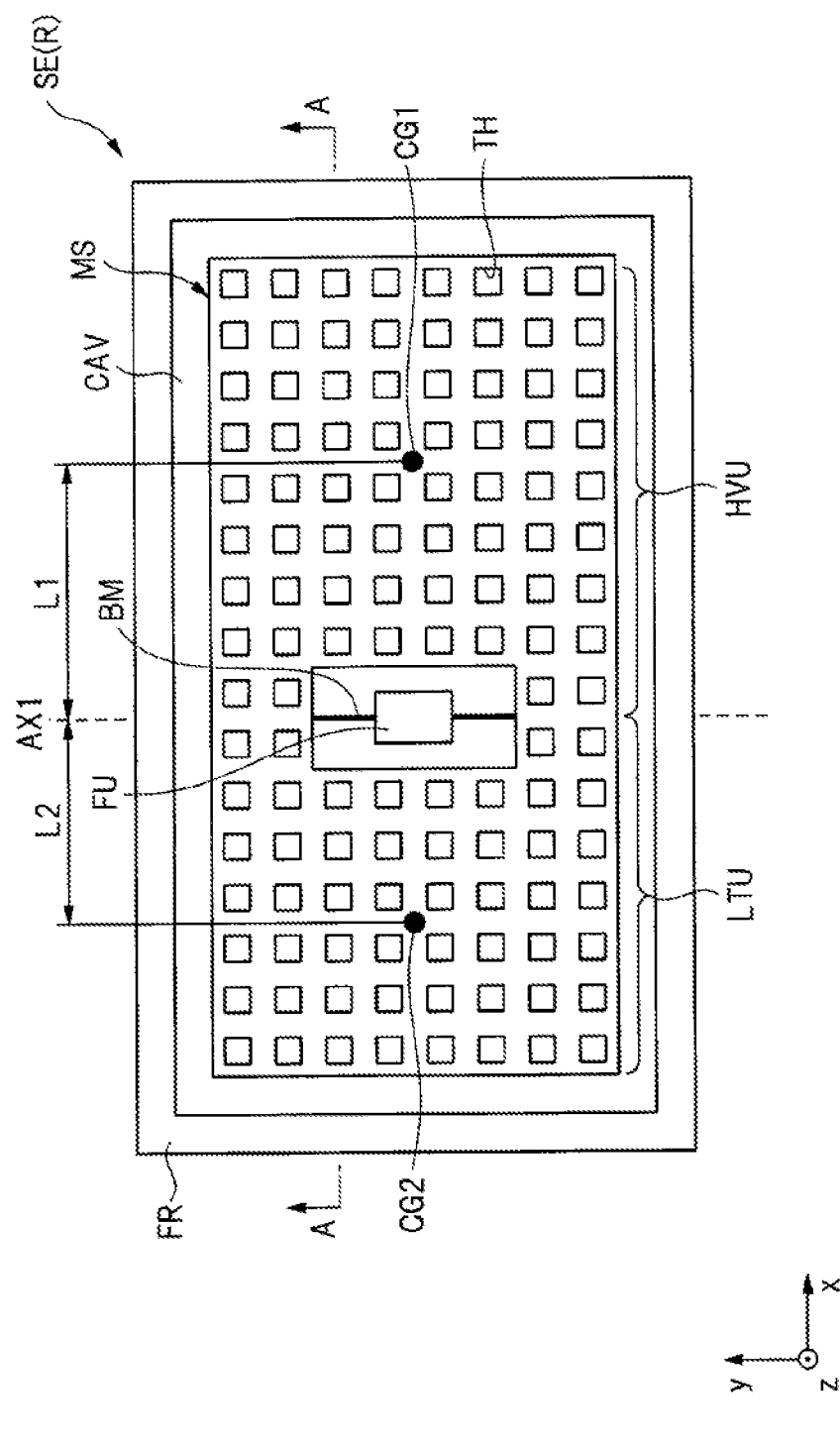

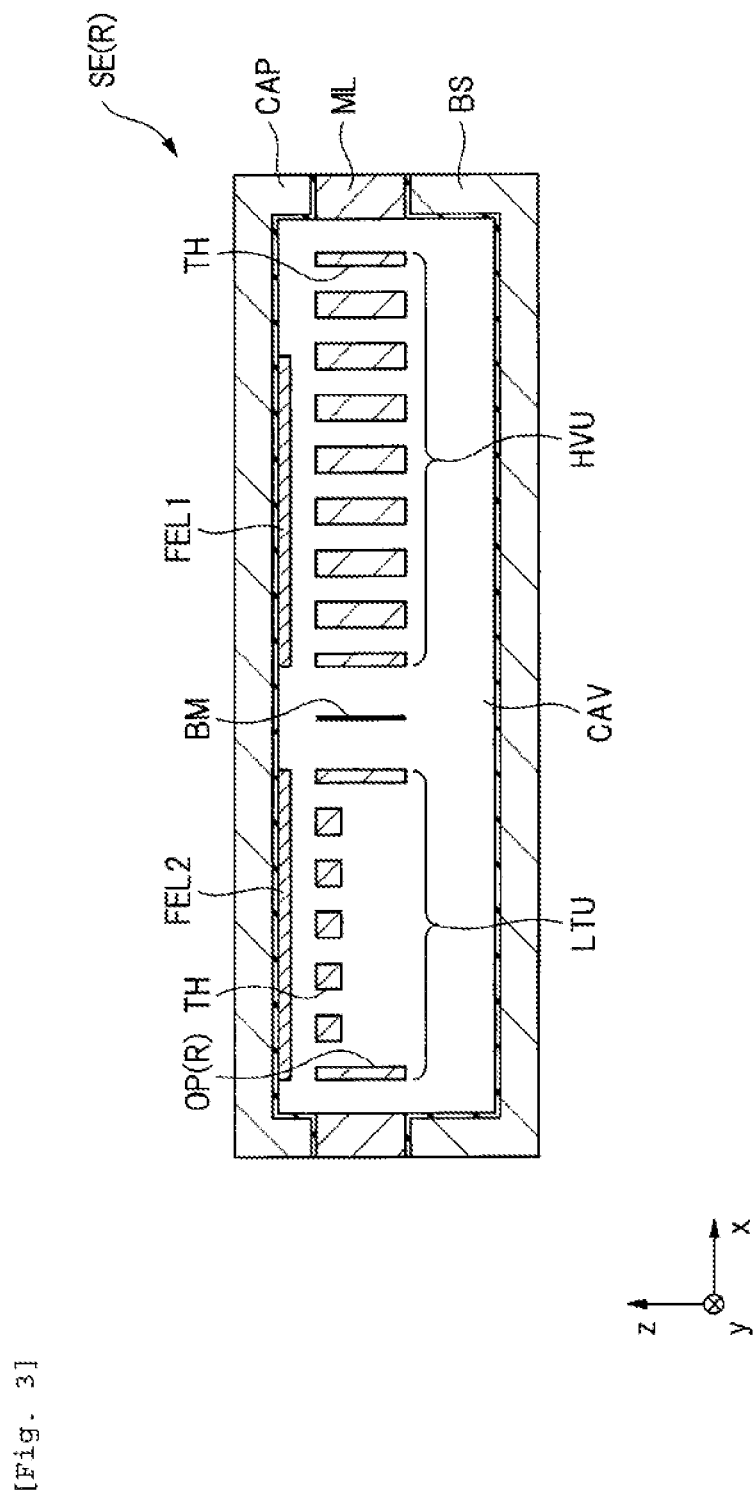
[Fig. 3]

[Fig. 4A]
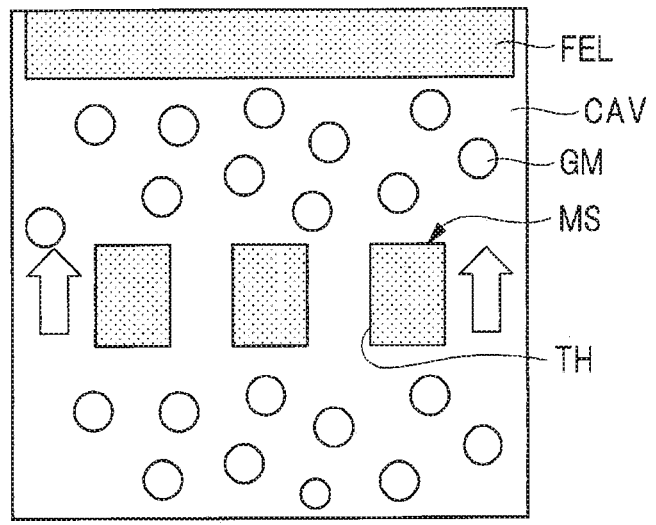
[Fig. 4B]
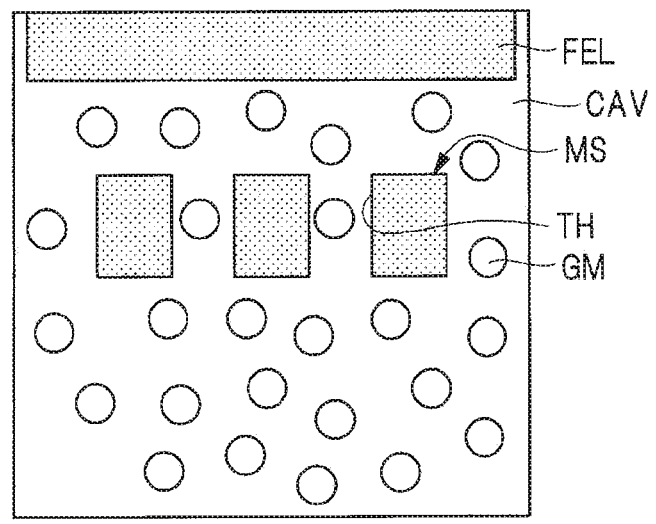

[Fig. 5]
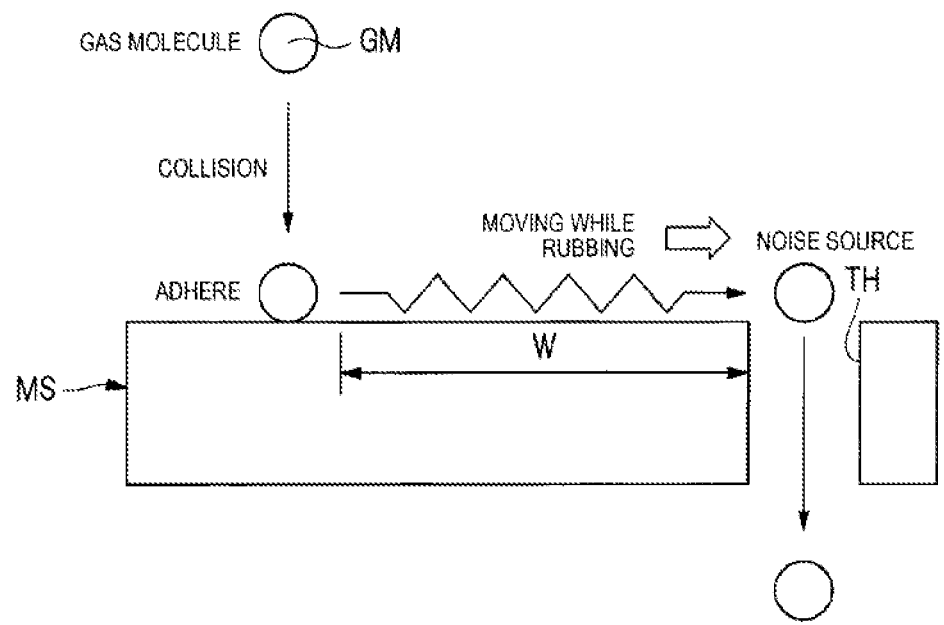

[Fig. 6A]
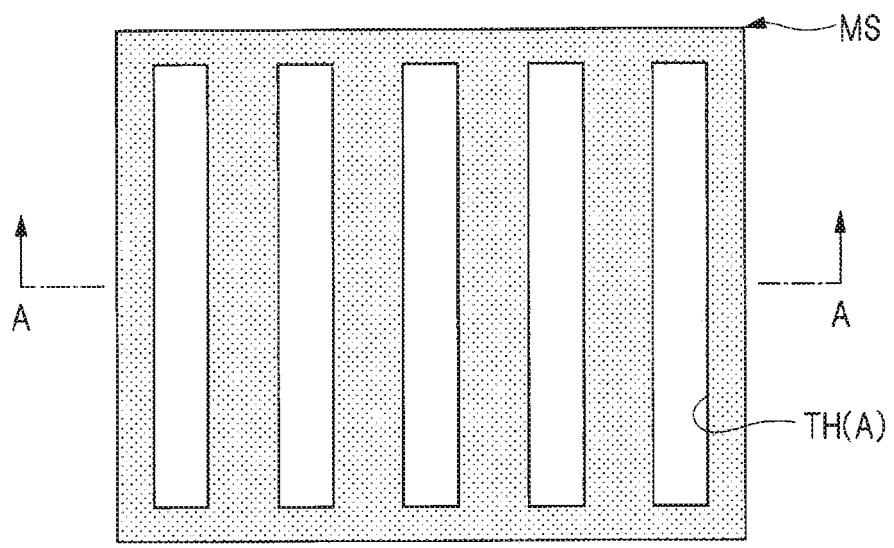
[Fig. 6B]
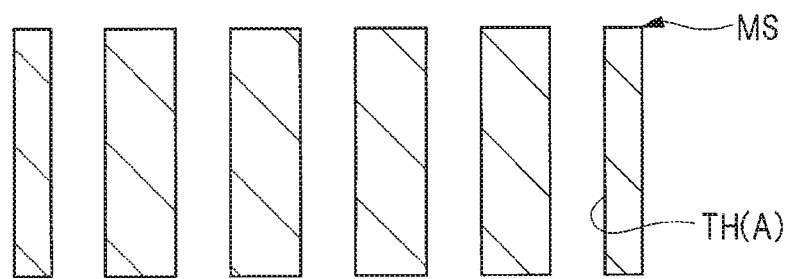

[Fig. 7A]
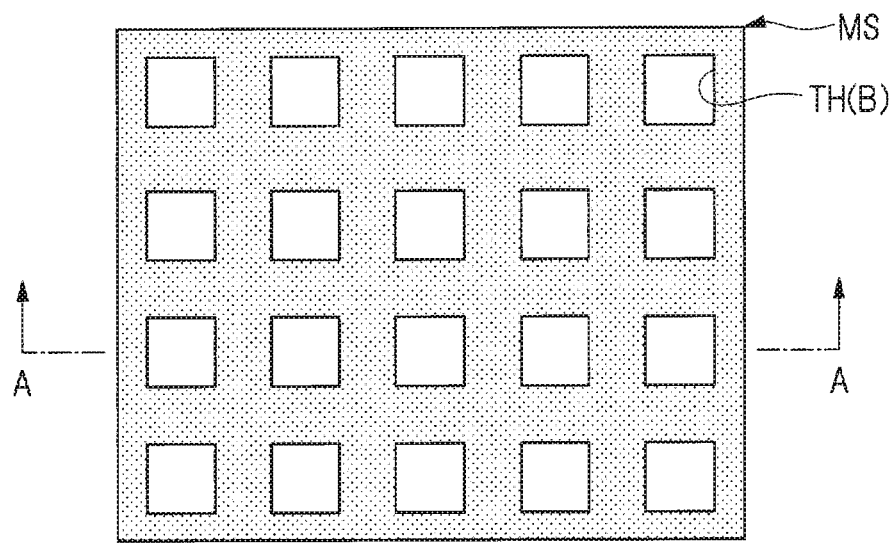
[Fig. 7B]
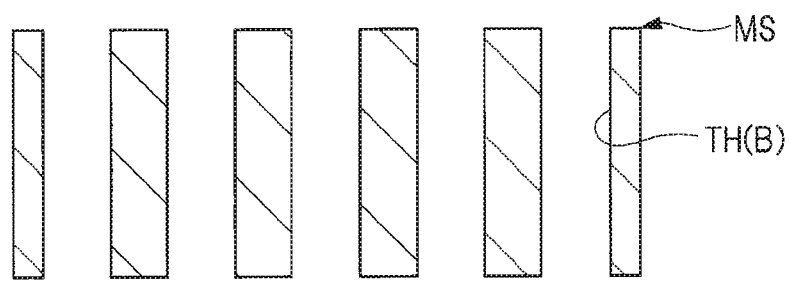

[Fig. 8A]
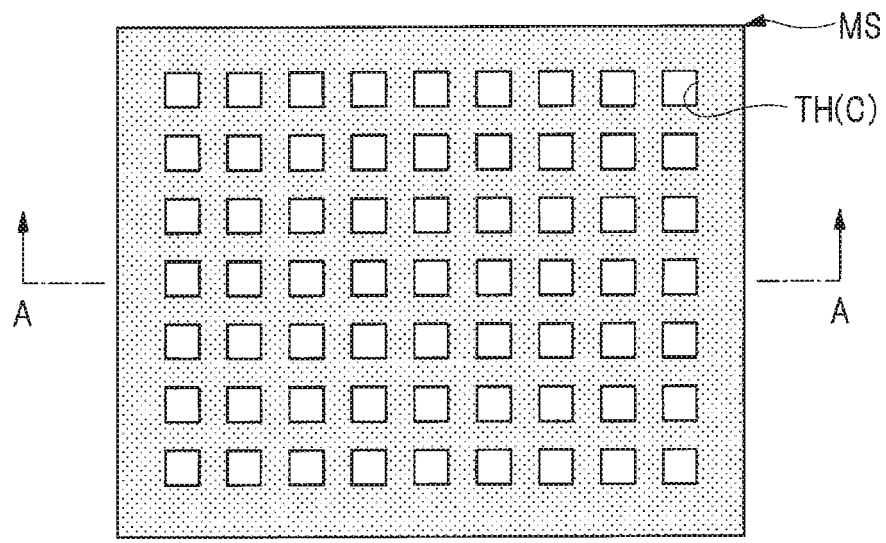
[Fig. 8B]
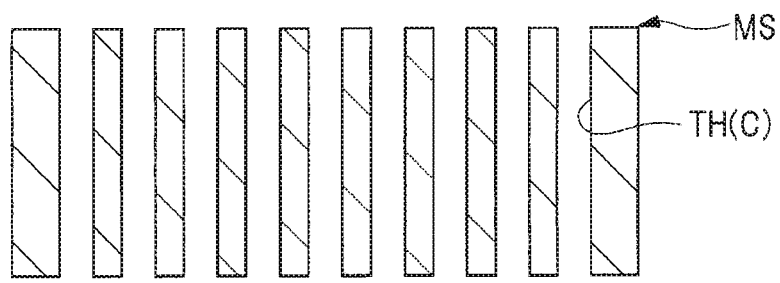

[Fig. 9]
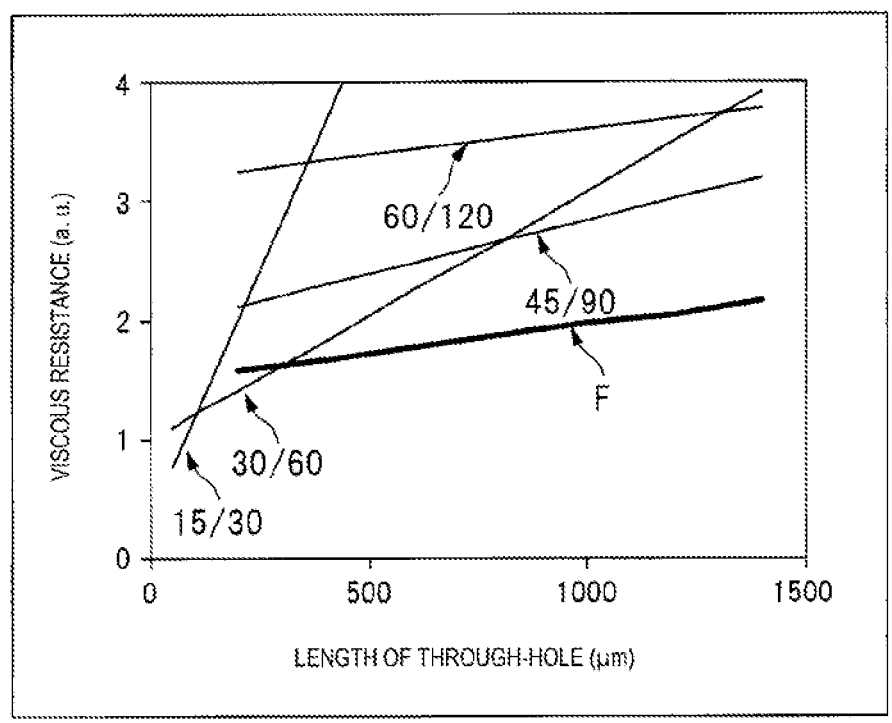

[Fig. 10]
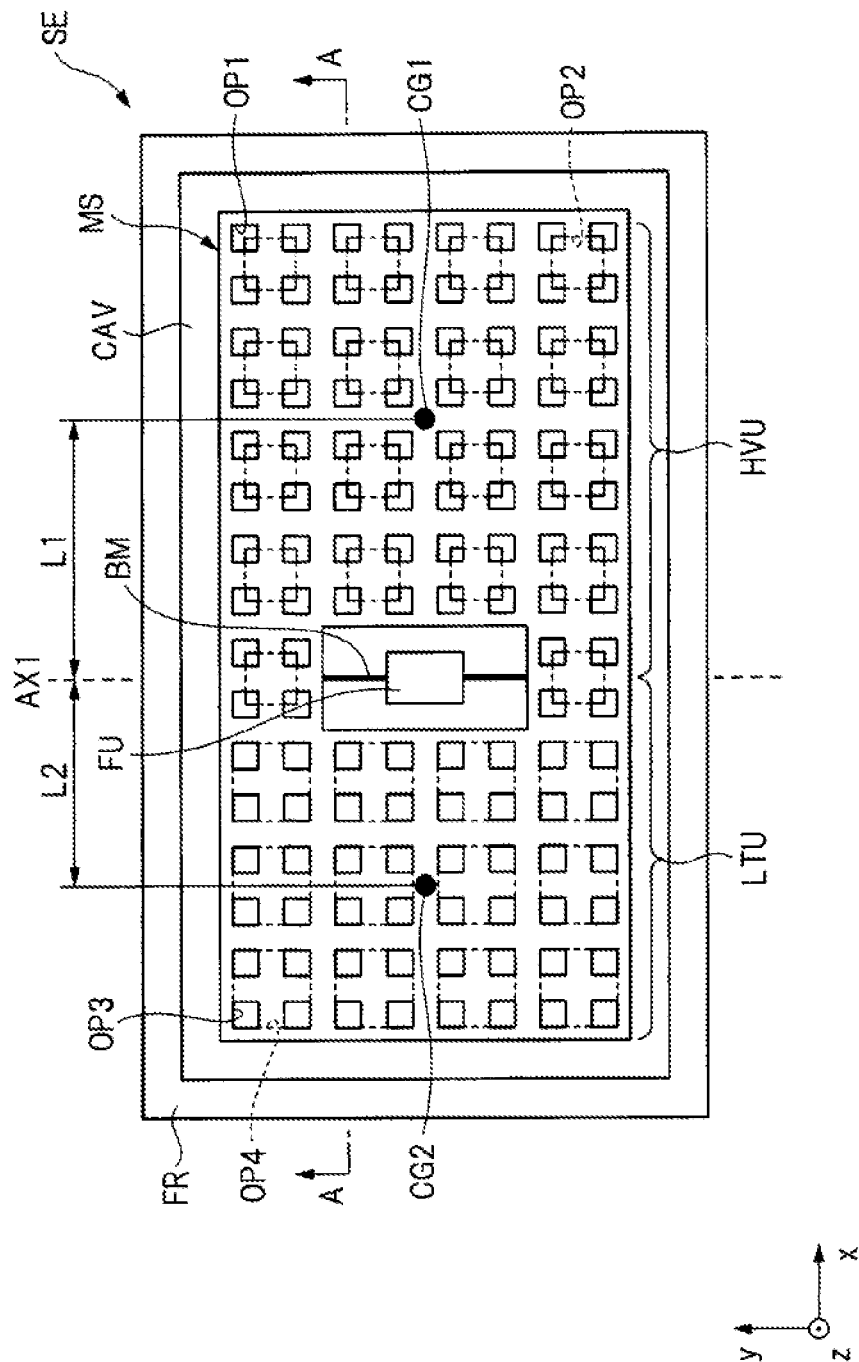

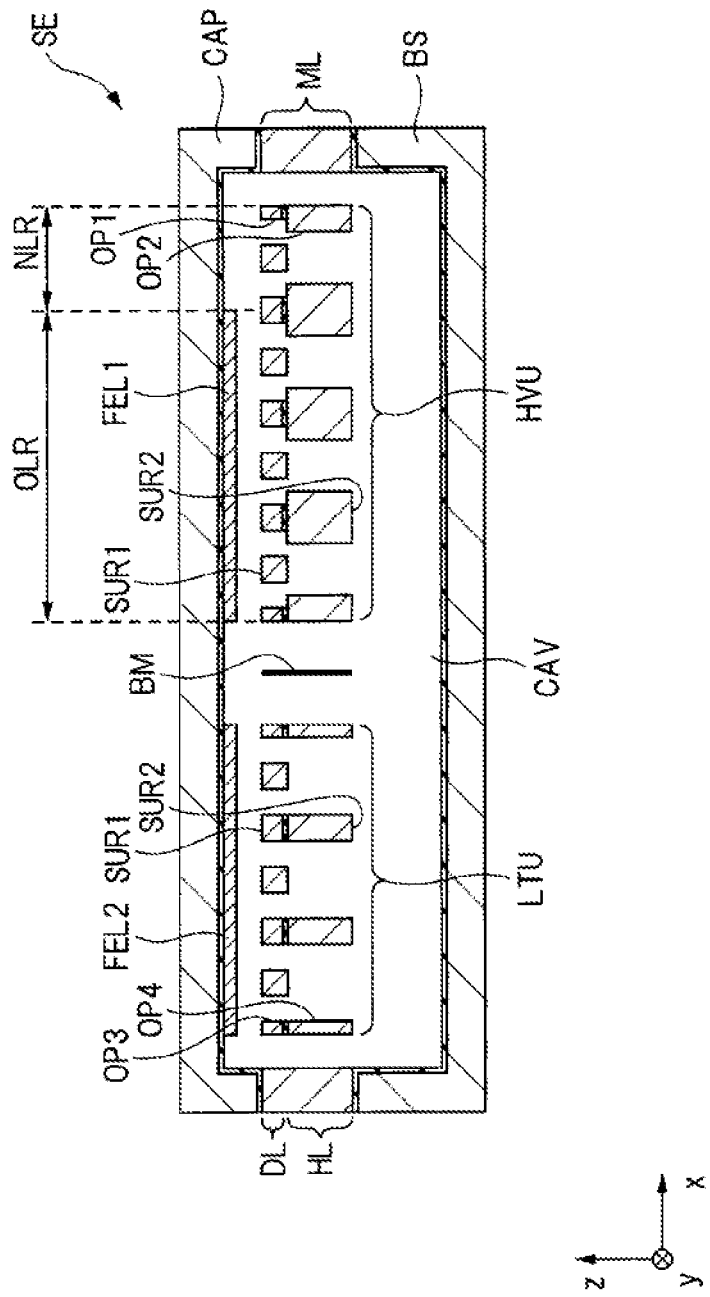
[Fig. 11]

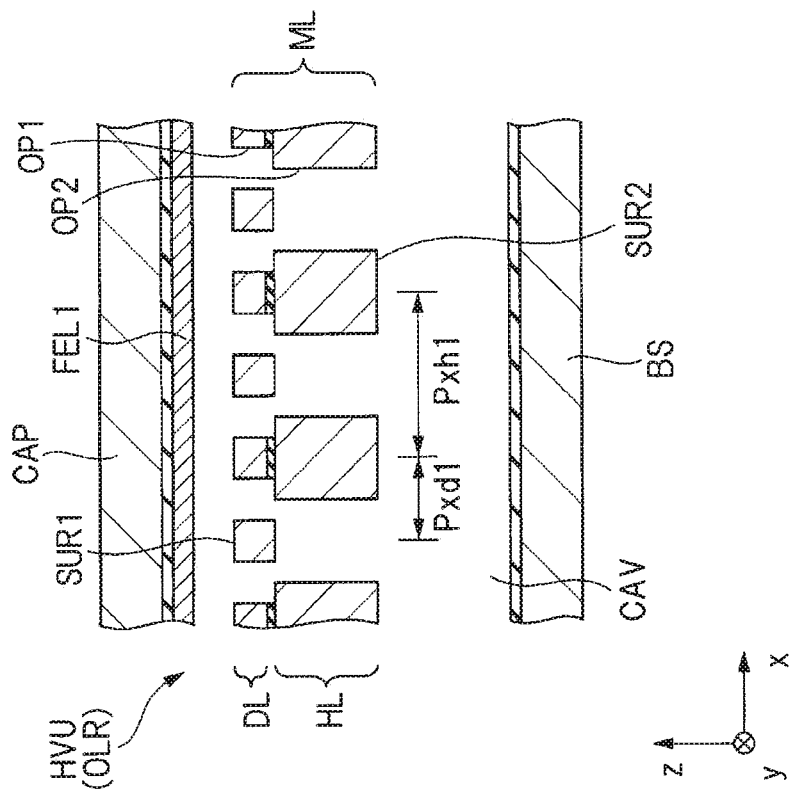
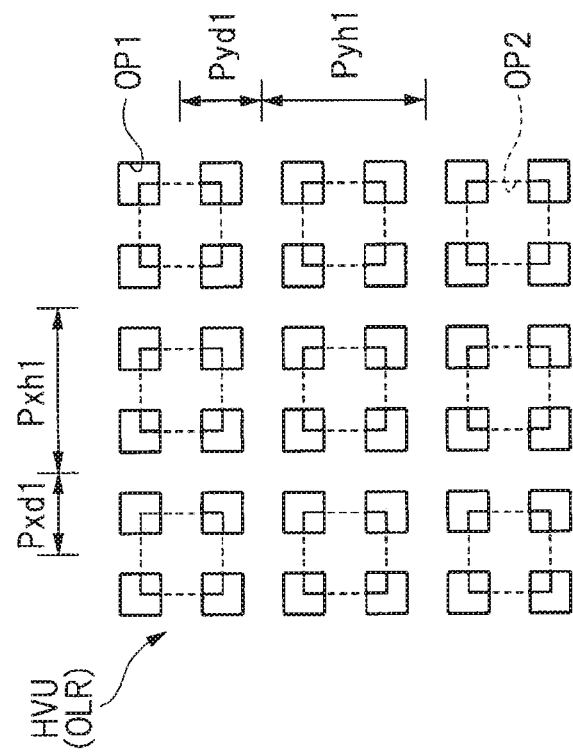

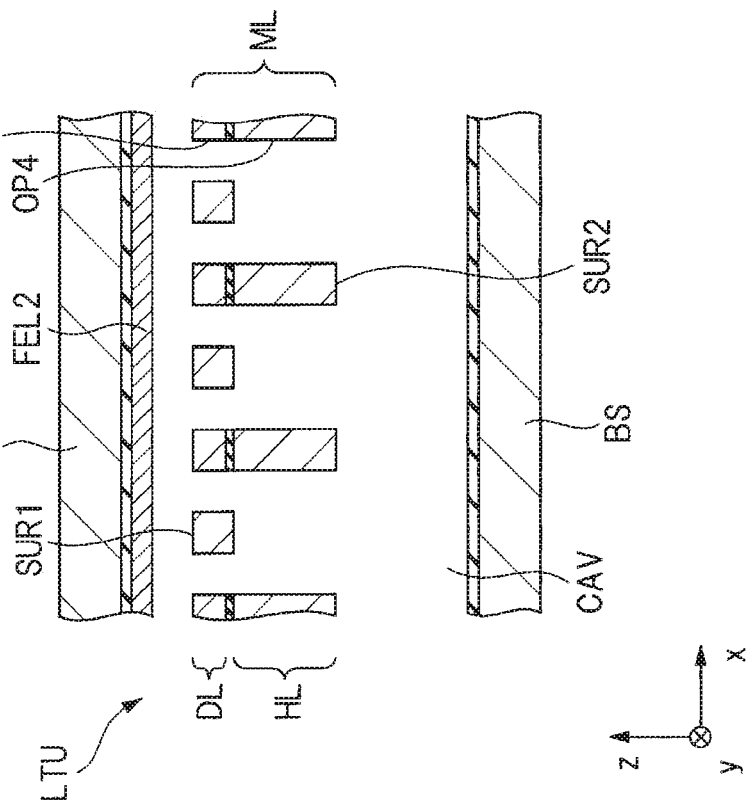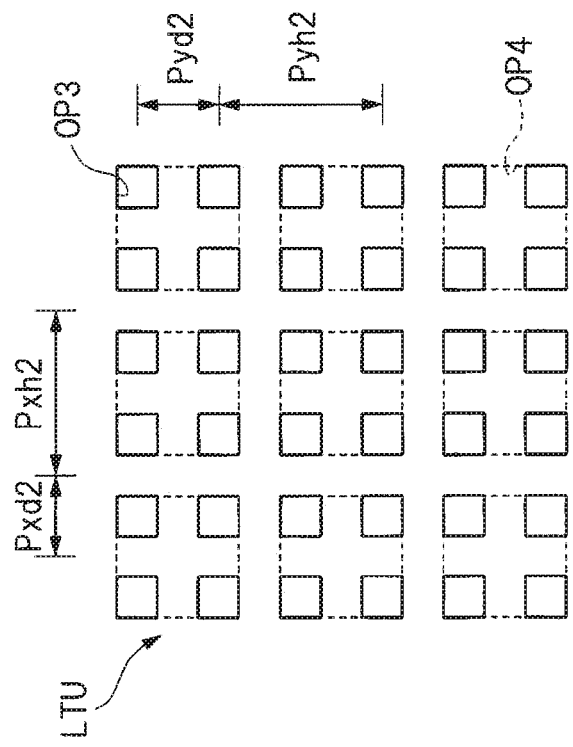

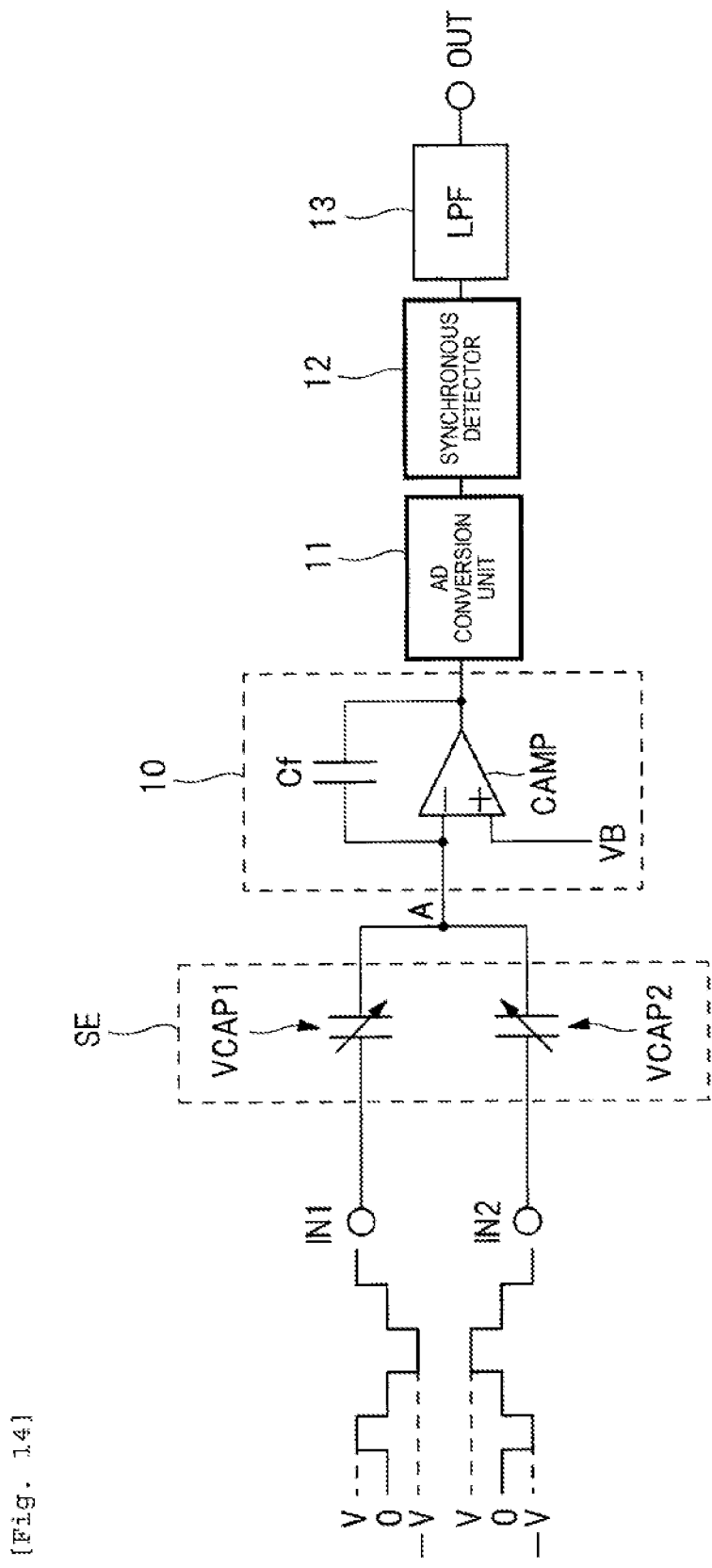
[Fig. 14]

[Fig. 15]
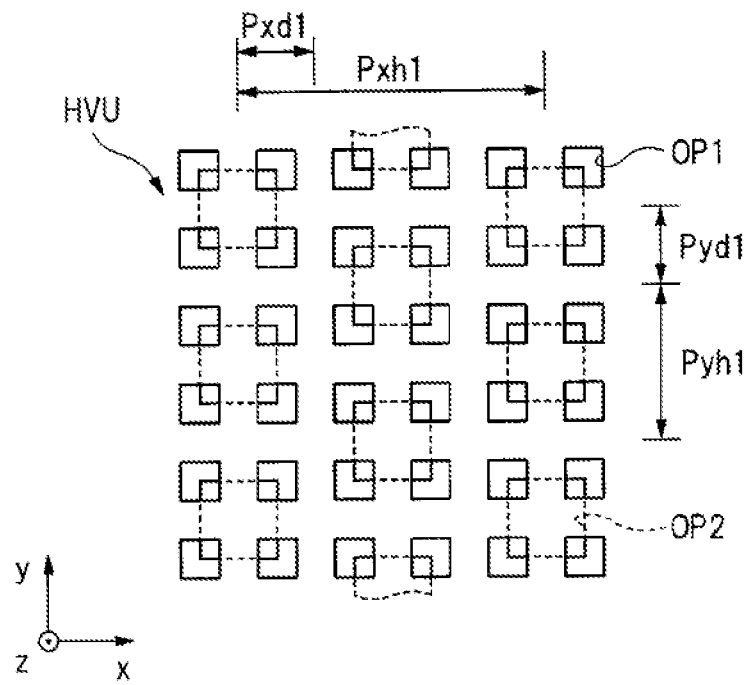
[Fig. 16]
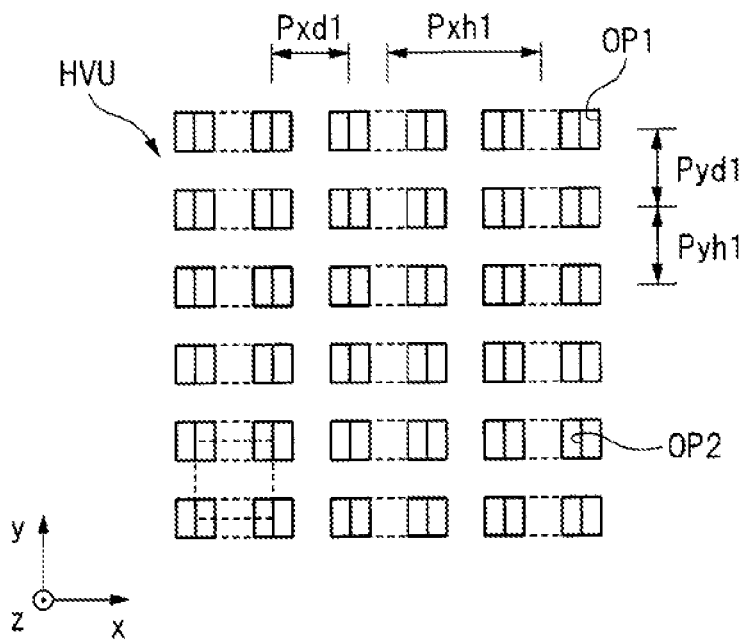

[Fig. 17]
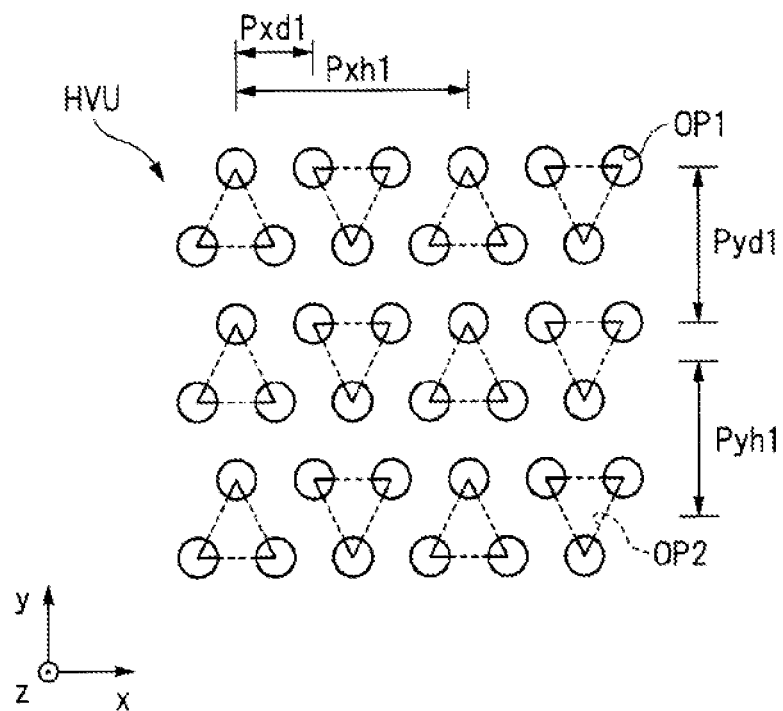

[Fig. 18]
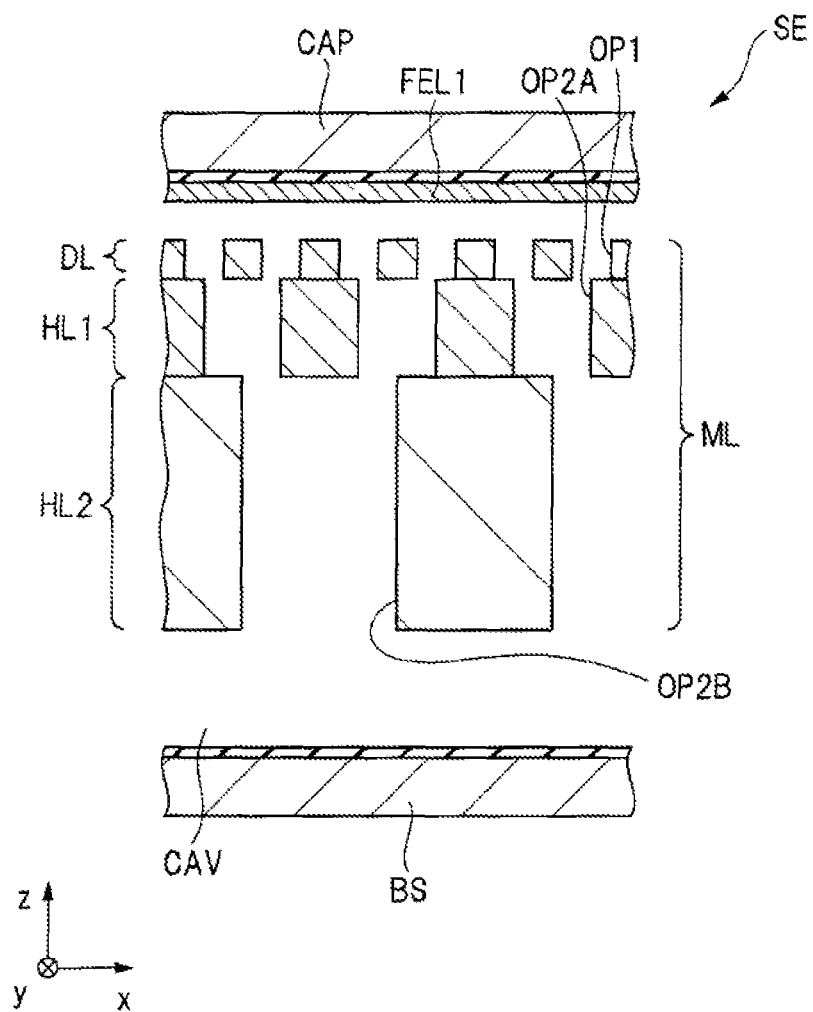

[Fig. 19]
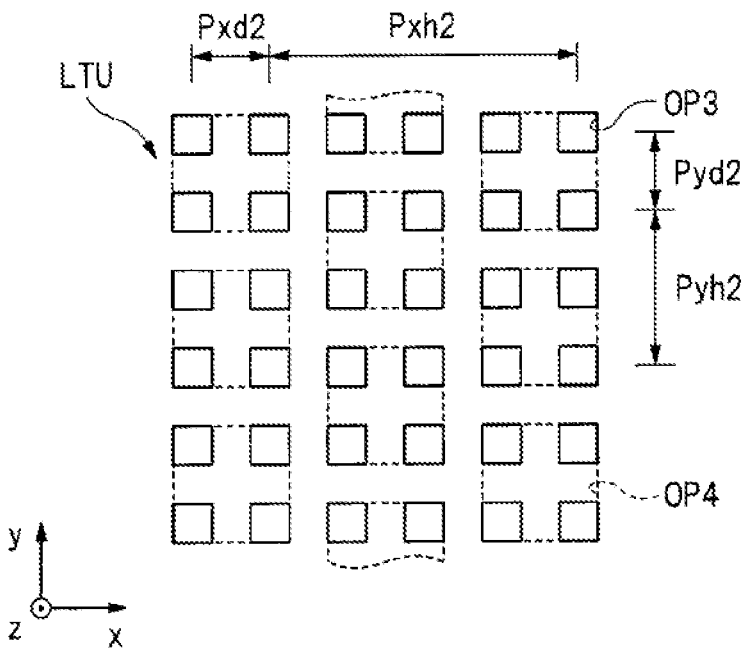
[Fig. 20]
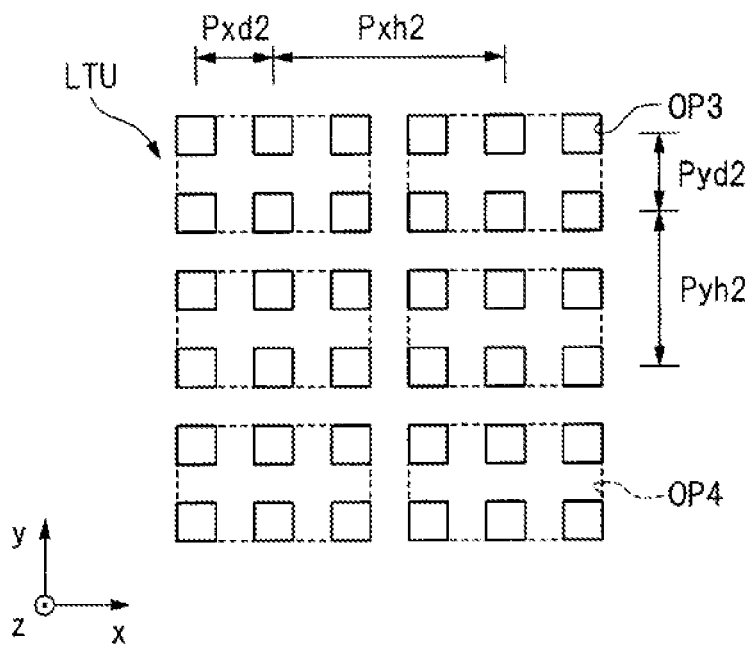

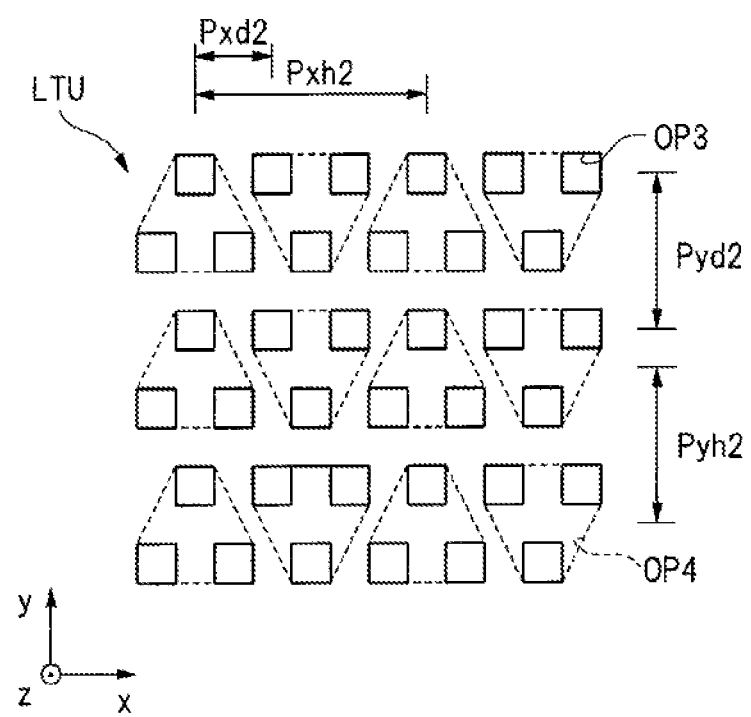
[Fig. 21]

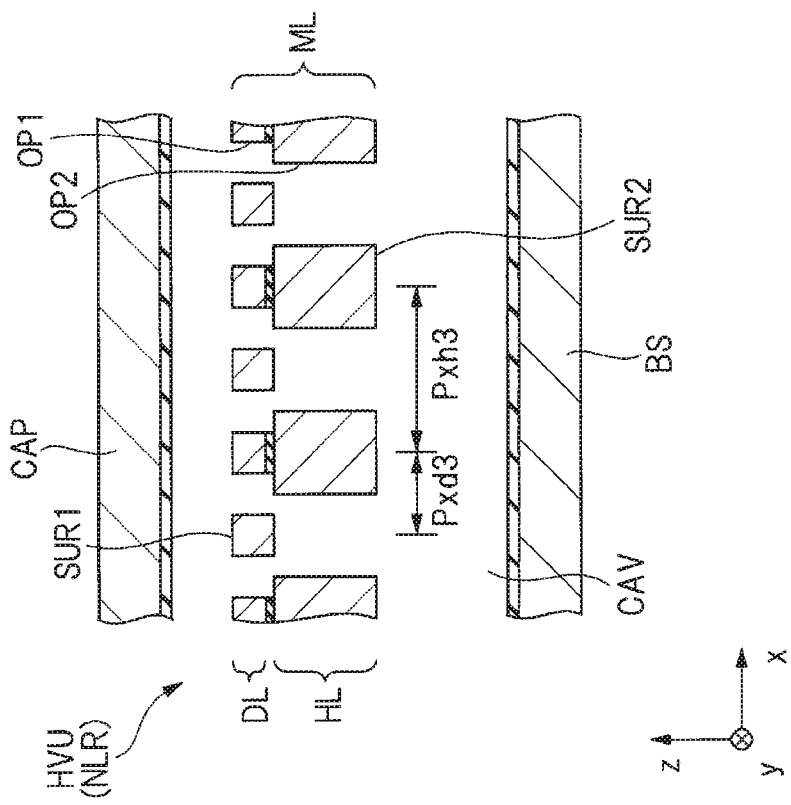
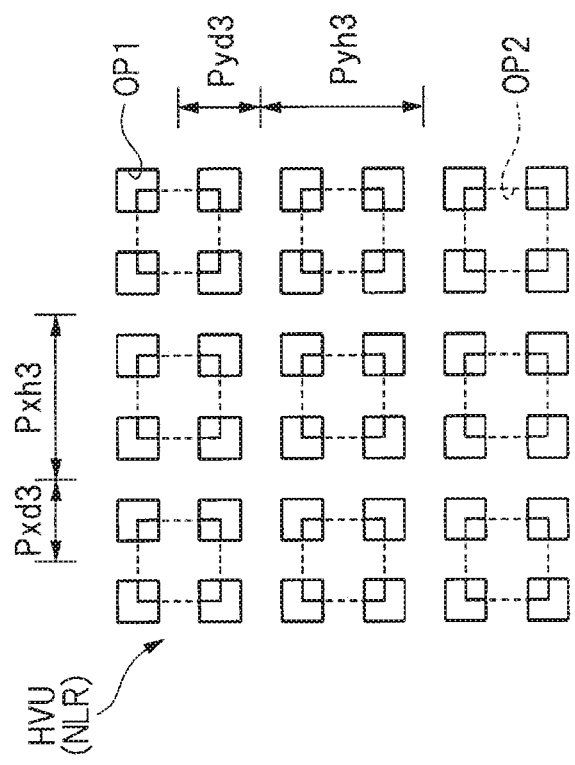
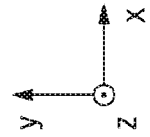

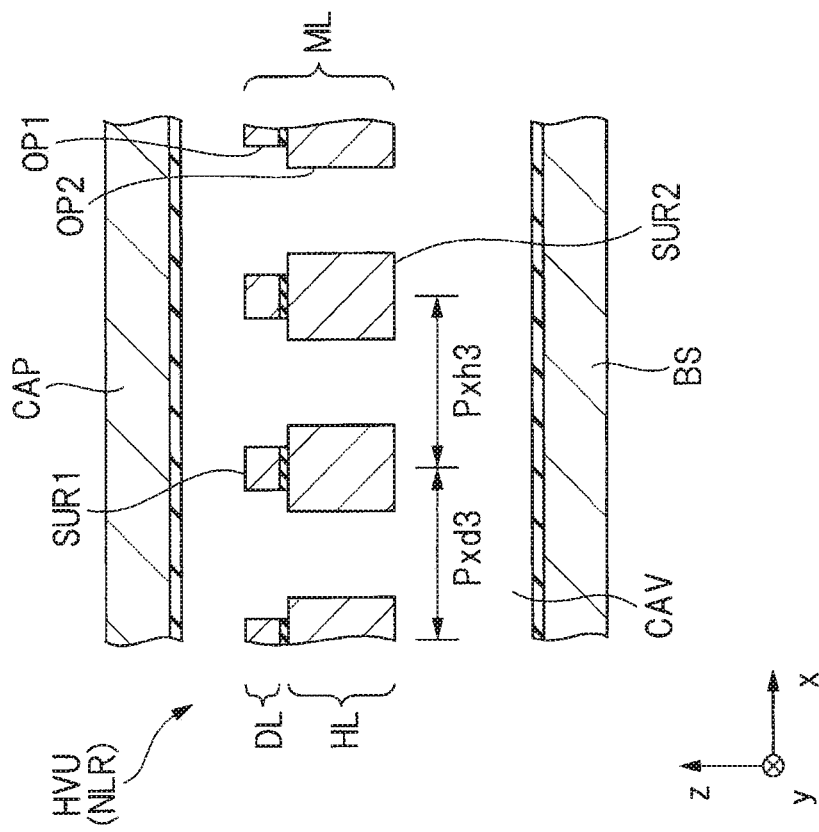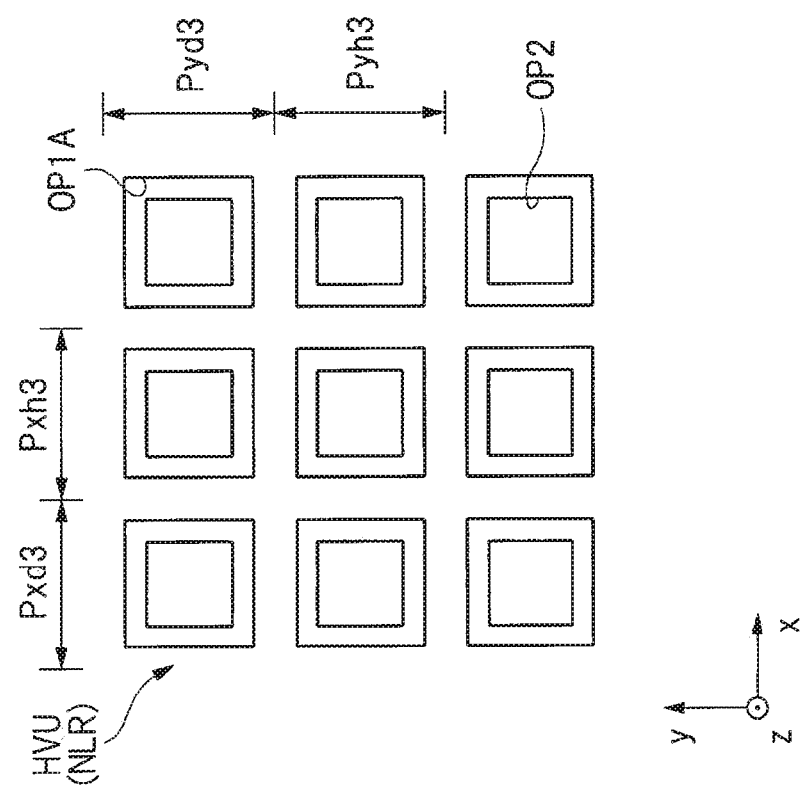

[Fig. 24]
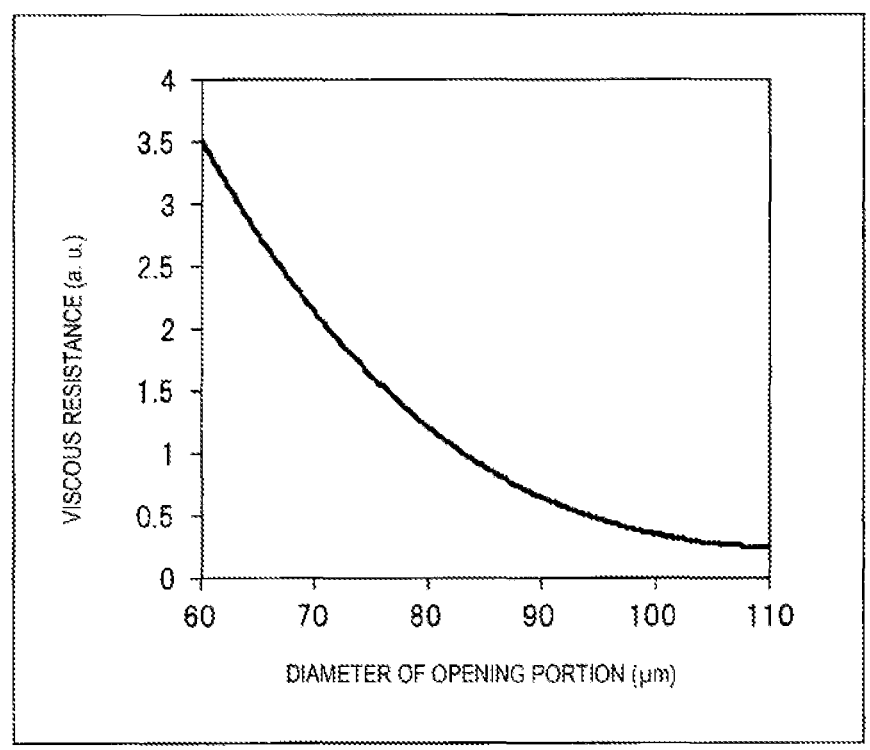

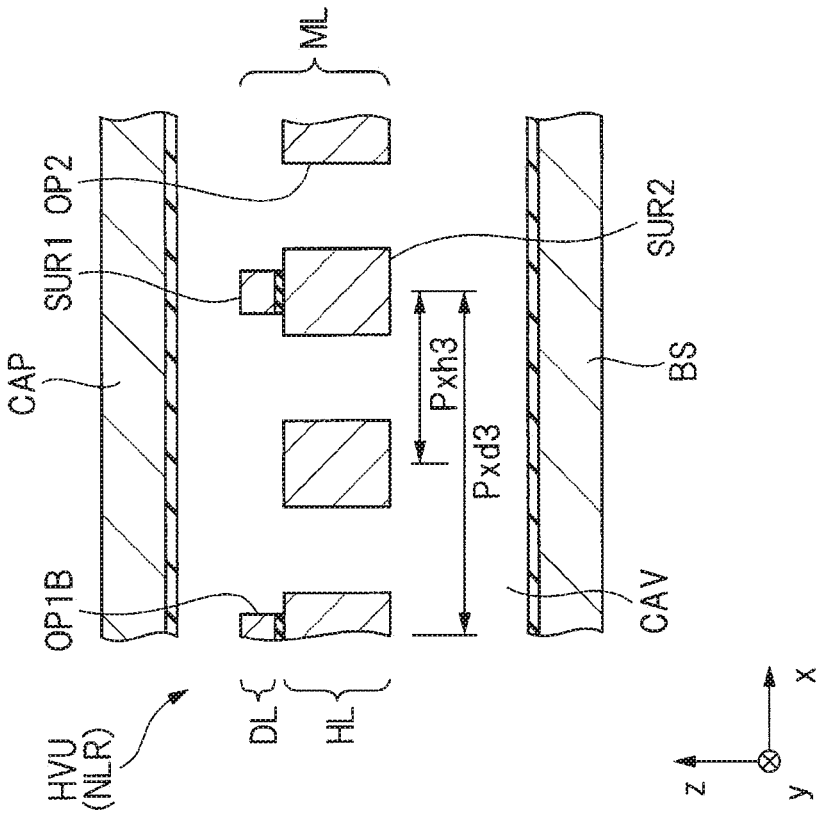
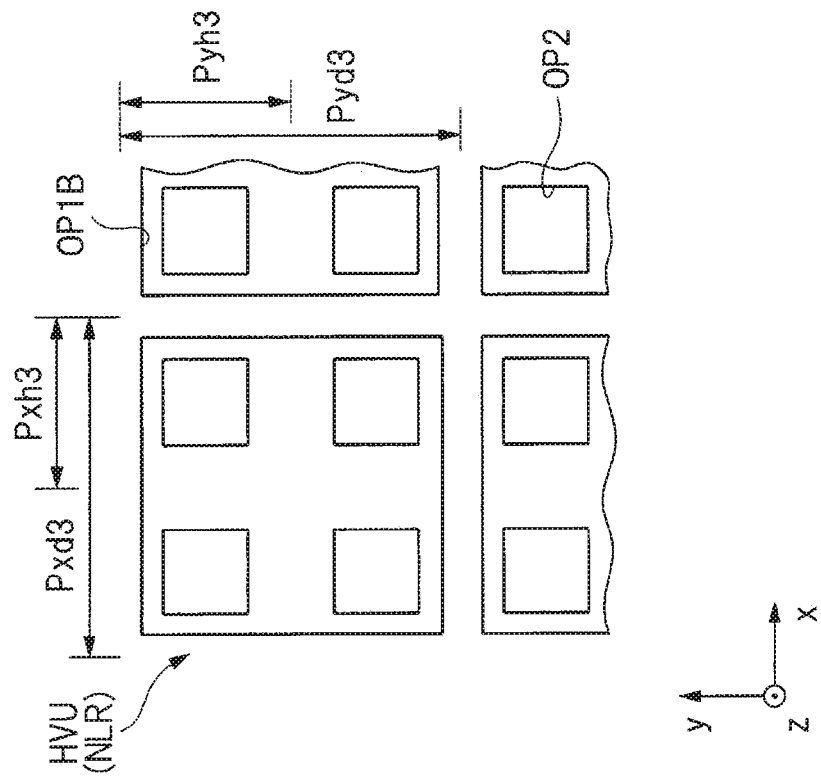

ACCELERATION SENSOR

TECHNICAL FIELD

The present invention relates to an acceleration sensor, and relates to, for example, a technique effectively applied to an acceleration sensor for detecting fine vibration acceleration.

BACKGROUND ART

JP-A-2012-88120 (PTL 1) describes a technique of reducing the mass of a lightweight section, by providing a concave portion in the lightweight section, in a physical quantity sensor of a seesaw structure including a heavyweight section and the lightweight section.

JP-A-2013-140148 (PTL 2) describes an acceleration sensor having a seesaw structure including a heavyweight section and a lightweight section, and a technique of reducing the mass of the lightweight section by providing an offset (step) in the lightweight section.

CITATION LIST

Patent Literature

PTL 1: JP-A-2012-88120
PTL 2: JP-A-2013-140148

SUMMARY OF INVENTION

Technical Problem

Reflection seismic survey is a method of generating shock waves or continuous waves on the surface of the earth to measure and analyze reflected waves, which are reflected from the underground reflective surface (a boundary surface where acoustic impedance changes) and return to the ground, by geophones installed on the surface of the earth, and exploring the depth distribution and subsurface structure of the underground reflective surface. For example, the reflection seismic survey is widely used as a main method of exploring for petroleum and natural gas. Especially, as a next generation reflection seismic survey sensor (geophone), an acceleration sensor which detects much smaller vibration acceleration than the gravitational acceleration has attracted attention. In order to put such an acceleration sensor into practical use, development of an acceleration sensor with low noise and very high sensitivity is desired.

An object of the present invention is to provide an acceleration sensor with low noise and high sensitivity.

Other problems and novel features will become apparent from the description of this specification and the accompanying drawings.

Solution to Problem

An acceleration sensor according to an embodiment includes a substrate; a fixing portion formed on the substrate; a mass body that includes a first portion provided on one side of the fixing portion and a second portion provided on the other side of the fixing portion, is formed on the substrate, and is displaceable in a thickness direction of the substrate. Further, the acceleration sensor includes a beam that is formed on the substrate and connects the fixing portion and the mass body to each other; a first fixed electrode disposed at a position facing the first portion of the mass body; and a second fixed electrode disposed at a position facing the second portion of the mass body. Here, the first surface of the substrate is a surface facing the first fixed electrode and the second fixed electrode, and the second surface of the substrate is a surface opposite to the first surface. In the acceleration sensor, a value obtained by multiplying a distance between the first center of gravity of the first portion and the center of the fixing portion by the mass of the first portion is greater than a value obtained by multiplying a distance between the second center of gravity of the second portion and the center of the fixing portion by the mass of the second portion. In this case, a first number of first opening portions are formed in a region corresponding to the first portion of the mass body, on the first surface of the substrate, and a second number of second opening portions are formed in a region corresponding to the first portion of the mass body, on the second surface of the substrate. The first opening portion and the second opening portion are connected to each other to form a plurality of first through portions in the substrate, and the first number is greater than the second number. In the acceleration sensor according to an embodiment, in plan view, at least, the planar size of some second opening portions among the plurality of second opening portions is larger than the planar size of some first opening portions among the plurality of first opening portions.

Advantageous Effects of Invention

According to an embodiment, it is possible to provide an acceleration sensor with low noise and high sensitivity.

BRIEF DESCRIPTION OF DRAWINGS

FIG. 1 is a schematic cross-sectional view of a surface of the earth that illustrates an overview of reflection elastic-wave survey.

FIG. 2 is a plan view showing a planar configuration of a sensor element constituting an acceleration sensor in the related art.

FIG. 3 is a cross-sectional view taken along line A-A of FIG. 2.

FIGS. 4A and 4B are schematic diagrams for explaining that a mass body is less likely to receive resistance from gas, by providing through-holes in the mass body.

FIG. 5 is a schematic diagram for explaining a mechanism by which mechanical noise is generated by an interaction between the mass body and gas molecules.

FIGS. 6A and 6B are schematic diagrams showing a layout configuration of through-holes in Examination Example 1 examined by the present inventor, FIG. 6A is a plan view, and FIG. 6B is a cross-sectional view taken along line A-A of FIG. 6A.

FIGS. 7A and 7B are schematic diagrams showing a layout configuration of through-holes in Examination Example 2 examined by the present inventor, FIG. 7A is a plan view, and FIG. 7B is a cross-sectional view taken along line A-A of FIG. 7A.

FIGS. 8A and 8B are schematic diagrams showing a layout configuration of the through-holes in Examination Example 3 examined by the present inventor, FIG. 8A is a plan view, and FIG. 8B is a cross-sectional view taken along line A-A of FIG. 8A.

FIG. 9 is a graph showing a relationship between the length (depth) of the through-hole and viscous resistance in a case where the diameter and pitch of the through-hole are changed, with an electrode area fixed at 75%.

FIG. 10 is a plan view illustrating a configuration of a sensor element of an embodiment.

FIG. 11 is a cross-sectional view taken along line A-A of FIG. 10.

FIG. 12A is a partially enlarged plan view schematically showing an arrangement of a plurality of opening portions formed in a heavyweight section of a mass body, and FIG. 12B is a partially enlarged cross-sectional view partially showing the heavyweight section of the mass body.

FIG. 13A is a partially enlarged plan view schematically showing an arrangement of a plurality of opening portions formed in a lightweight section of a mass body, and FIG. 13B is a partially enlarged cross-sectional view partially showing the lightweight section of the mass body.

FIG. 14 is a circuit block diagram for explaining the operation of the acceleration sensor according to the embodiment.

FIG. 15 is a schematic diagram showing the layout configuration of the opening portions formed in a heavyweight section in Modification Example 1.

FIG. 16 is a schematic diagram showing the layout configuration of the opening portions formed in a heavyweight section in Modification Example 2.

FIG. 17 is a schematic diagram showing the layout configuration of the opening portions formed in a heavyweight section in Modification Example 3.

FIG. 18 is an enlarged sectional view showing a part of the sensor element in Modification Example 4 in an enlarged manner.

FIG. 19 is a schematic diagram showing the layout configuration of the opening portions formed in a lightweight section in Modification Example 5.

FIG. 20 is a schematic diagram showing the layout configuration of the opening portions formed in a lightweight section in Modification Example 6.

FIG. 21 is a schematic diagram showing the layout configuration of the opening portions formed in a lightweight section in Modification Example 7.

FIGS. 22A and 22B are schematic diagrams showing a layout configuration of an opening portion formed in a non-overlapping region, FIG. 22A is a plan view and FIG. 22B is a cross-sectional view.

FIGS. 23A and 23B are schematic diagrams showing a layout configuration of an opening portion formed in a non-overlapping region, FIG. 23A is a plan view and FIG. 23B is a cross-sectional view.

FIG. 24 is a graph showing a relationship between the diameter of the opening portion and viscous resistance.

FIGS. 25A and 25B are schematic diagrams showing a layout configuration of an opening portion formed in a non-overlapping region, FIG. 25A is a plan view and FIG. 25B is a cross-sectional view.

DESCRIPTION OF EMBODIMENTS

In the following embodiments, when necessary for convenience, a description will be made by separating the invention into a plurality of sections or embodiments, but unless otherwise specified, they are not unrelated to each other, one is in a relationship such as a modification, details, supplementary explanation, or the like of a part or the whole of the other.

Further, in the following embodiments, in a case of referring to the number of elements (including number, numerical value, quantity, range, or the like), except for a case where it is expressly specified, and a case where it is obviously limited to a specific number in principle, or the like, it is not limited to the specific number, and it may be the specific number or more or less.

Furthermore, in the following embodiments, it goes without saying that the constituent elements (including element steps or the like) are not essential, except for the case where they are explicitly stated or the case where it is considered to be essential obviously in principle.

Similarly, in the following embodiments, when referring to shapes, positional relationships, or the like, except for the case where they are explicitly stated and the case where it is considered not to be essential obviously in principle, it is assumed that shapes substantially approximate or similar to its shape and the like are included. This also applies to the above numerical value and range.

In addition, in all of the drawings for describing the embodiments, the same reference numerals will be given to the same members in principle, and the repetitive description thereof will be omitted. Even in a plan view, hatching may be added to make drawings easy to see.

Although the technical idea in the present embodiment can be widely applied to inertial sensors typified by an acceleration sensor and an angular velocity sensor, in the following description, in particular, the technical idea in the present embodiment will be described with the acceleration sensor as an example.

<Application Example of Acceleration Sensor>

The acceleration sensor is used in a wide range of fields such as automobile attitude control, smart phones, game machines, or the like. The acceleration sensor used in these fields has a small size, and can detect accelerations several times as large as gravity in a low frequency bandwidth of several hundred Hz or less.

On the other hand, in recent years, the application field of the acceleration sensor has been expanded not only to the above-mentioned fields but also to the field of exploration of underground resources. In the field of exploration of underground resources, the reflection elasticwave survey (reflection seismic survey), which is a type of geophysical exploration, is a technique in which seismic wave is generated artificially, geophones (acceleration sensors) installed on the surface of the earth captures reflected waves bouncing off the underground, and the result is analyzed to elucidate the underground structure.

FIG. 1 is a schematic cross-sectional view of the surface of the earth, which illustrates an overview of the reflection elasticwave survey. In FIG. 1, elastic waves (arrows in FIG. 1) propagate from a vibration source VB installed on the surface of the earth GND to the ground, and then the elastic waves reflected by the boundary BUD1 and the boundary BUD2 of a plurality of strata are sensed by acceleration sensors (geophones) AS installed on the surface of the earth GND. Since the general vibration source VB vibrates in a direction vertical to the surface of the earth, P waves are efficiently excited in a direction close to the vertical direction. Therefore, in the reflection elasticwave survey, P waves are used. Further, since the elastic waves returning again to the surface of the earth GND are P waves propagating from the direction close to the vertical direction, the acceleration sensor AS needs to detect elastic vibration in the vertical direction.

As illustrated in FIG. 1, elastic waves excited in various directions propagate through the ground with large attenuation, are reflected at the boundaries BUD1 and BUD2 of a plurality of strata, propagate again through the ground with large attenuation, diffuse to a wide region, and return to the surface of the earth GND.

In this way, in the reflection elasticwave survey, the acceleration sensors AS need to be highly sensitive in the vertical direction in order to detect weak elastic vibration. Specifically, since the acceleration of weak elastic vibration is smaller than the acceleration of gravity, the acceleration sensor used in the reflection elasticwave survey is required to detect acceleration smaller than the acceleration of gravity with high sensitivity.

<Acceleration Sensor in the Related Art>

First, the configuration of an acceleration sensor in the related art will be described. Here, the "related art" referred to in this specification is a technology having a problem newly discovered by the inventor. "Related art" is not the known related art, but rather is a technique described with the intention of a technique (unknown technique) that is the premise of a novel technical idea.

FIG. 2 is a plan view showing a planar configuration of a sensor element SE(R) constituting the acceleration sensor in the related art. As shown in FIG. 2, the sensor element SE(R) in the related art has a frame FR, and a mass body MS is disposed in a cavity CAV provided inside the frame FR. A large opening portion is formed in the vicinity of the center portion of the mass body MS, and the fixing portion FU is disposed so as to be included in the opening portion. The mass body MS and the fixing portion FU are mechanically connected by a pair of beams BM. More specifically, assuming that a line passing through the center of the fixing portion FU and extending in the y-direction is an imaginary line AX1, a beam BM extending along the imaginary line AX1 is provided. In this case, a part located on the right side of the imaginary line AX1 in the mass body MS is a heavyweight section HVU, and a part located on the left side of the imaginary line AX1 in the mass body MS is a lightweight section LTU. As shown in FIG. 2, in the sensor element SE(R) in the related art, a value obtained by multiplying a distance L1 in the x-direction between the imaginary line AX1 and the center of gravity CG1 of the heavyweight section HVU by the mass of the heavyweight section HVU is larger than a value obtained by multiplying a distance L2 in the x-direction between the imaginary line AX1 and the center of gravity CG2 of the lightweight section LTU by the mass of the lightweight section LTU. This makes a configuration of the sensor element SE(R) having a seesaw structure. Further, in the sensor element SE(R) in the related art, as shown in FIG. 2, a plurality of through-holes TH are formed in the mass body MS. In particular, a plurality of through-holes TH having the same size are formed in both the heavyweight section HVU and the lightweight section LTU constituting the mass body MS.

As shown in FIG. 2, the beam BM extends in the y-direction, one end in the y-direction of the beam BM is connected to the fixing portion FU, while the other end in the y-direction of the beam BM is connected to the mass body MS. The beam BM configured in this way is configured so that the end on the mass body MS side can be twisted with respect to the end on the fixing portion FU side by elastic deformation. As a result, when acceleration is applied in the z-direction, a twist (elastic deformation) of the beam BM occurs, and due to the twist of the beam BM, the mass body MS is rotationally displaced about the imaginary line AX1 as a rotation axis. That is, the sensor element SE(R) in the related art has a seesaw structure in which the mass body MS is rotationally displaced about the imaginary line AX1 corresponding to the acceleration in the z-direction.

FIG. 3 is a cross-sectional view taken along line A-A of FIG. 2. As shown in FIG. 3, the sensor element SE(R) in the related art has, for example, a base BS made of silicon, a membrane layer ML made of silicon, and a cap CAP made of silicon. Specifically, a concave portion is formed in the base BS, and an insulating film made of, for example, a silicon oxide film is formed on the surface of the base BS on which the concave portion is formed. Then, a membrane layer ML is disposed on the base BS on which the concave portion is formed. Therefore, as shown in FIG. 3, a gap corresponding to a concave portion formed in the base BS is interposed between the base BS and the membrane layer ML, and a connecting portion between the base BS and the membrane layer ML is electrically insulated by an insulating film formed on the surface of the base BS. On the other hand, as shown in FIG. 3, a cap CAP having a concave portion is disposed on the membrane layer ML. From this, in the sensor element SE(R) in the related art, a cavity CAV is provided by the concave portion formed in the base BS and the concave portion formed in the cap CAP. The membrane layer ML is disposed in the cavity CAV and then is disposed so as to be interposed between the base BS and the cap CAP.

As shown in FIG. 3, a mass body MS connected to the beam BM and the beam BM is formed on the membrane layer ML. Particularly, the mass body MS includes a heavyweight section HVU disposed on the right side of the beam BM and a lightweight section LTU disposed on the left side of the beam BM. A fixed electrode FEL1 is formed on the surface of the cap CAP facing the heavyweight section HVU, and a fixed electrode FEL2 is formed on the surface of the cap CAP facing the lightweight section LTU. Accordingly, in the related art, a first capacitive element (first capacitance) is formed by the heavyweight section HVU of the mass body MS and the fixed electrode FEL1, and a second capacitive element (second capacitance) is formed by the lightweight section LTU of the mass body MS and the fixed electrode FEL2. In each of the first capacitive element and the second capacitive element, when the mass body MS constituting the sensor element SE(R) is displaced in the z-direction, the capacitance changes. That is, the sensor element SE(R) in the related art can capture the displacement of the mass body MS as a change in capacitance. That is, the acceleration sensor in the related art is configured such that the mass body MS performs a see-saw action (displacement in the z-direction) due to the acceleration in the z-direction, and the displacement in the z-direction of the mass body MS can be captured as a change in the capacitance of the first capacitive element and a change in the capacitance of the second capacitive element.

Here, in the sensor element SE(R) in the related art, in order to realize a seesaw structure, the mass of the heavyweight section HVU of the mass body MS is different from the mass of the lightweight section LTU of the mass body MS. Specifically, as shown in FIG. 2, the imaginary line AX1 which is the boundary line between the heavyweight section HVU and the lightweight section LTU is shifted toward the lightweight section LTU side from the center line in the x-direction of the mass body MS. That is, the fixing portion FU and the beam BM located on the imaginary line AX1 are shifted toward the lightweight section LTU from the center line in the x-direction of the mass body MS. As a result, in the sensor element SE (R) in the related art, the mass of the lightweight section LTU can be reduced than the mass of the heavyweight section HVU. Further, in the related art, as shown in FIG. 3, a plurality of through-holes TH are formed in the heavyweight section HVU while the plurality of through-holes TH and a large opening portion OP(R) including the plurality of through-holes TH are formed in the lightweight section LTU. As a result, the mass of the lightweight section LTU can be further reduced corresponding to the formation of the large opening portion OP(R). That is, in the related art, the large opening portion OP(R) provided in the lightweight section LTU has a function of reducing the mass of the lightweight section LTU. The acceleration sensor in the related art is configured in this way.

<Examination of Improvement from Viewpoint of Improving S/N Ratio>

High sensitivity is required for an acceleration sensor that detects an acceleration that is smaller than the gravitational acceleration. Specifically, realizing a highly sensitive acceleration sensor means realizing an acceleration sensor with a high signal/noise ratio (S/N ratio). In particular, in order to improve the S/N ratio in an acceleration sensor having a seesaw structure, for example, the following configuration can be considered.

Firstly, the S/N ratio can be improved by realizing a large seesaw action against minute acceleration. Specifically, the S/N ratio can be improved by increasing the rotational force (torque) of the mass body MS caused by minute acceleration. This is because the increase in the rotational force of the mass body MS means that the displacement of the mass body MS caused by the minute acceleration increases, which means that the change in the capacitance increases. That is, as the change in capacitance corresponding to minute acceleration increases, the detection signal (signal) of acceleration increases. That is, the detection signal (signal) of the acceleration based on the change of the capacitance increases by increasing the rotational force of the mass body MS, thereby improving the S/N ratio. Specifically, the increase in the rotational force of the mass body MS can be realized by increasing a difference between the rotational force applied to the heavyweight section HVU of the mass body MS and the rotational force applied to the lightweight section LTU of the mass body MS. More specifically, the rotational force (torque) of the heavyweight section HVU is expressed by the product of the distance between the rotating shaft and the center of gravity of the heavyweight section HVU and the mass of the heavyweight section HVU, and the rotational force (torque) of the lightweight section LTU is expressed by the product of the distance between the rotating shaft and the center of gravity of the lightweight section LTU and the mass of the lightweight section LTU. From this, the increase in the rotational force of the entire mass body MS can be realized by increasing a difference between the mass of the heavyweight section HVU and the mass of the lightweight section LTU, and increasing a difference of a distance between the rotating shaft and the center of gravity. Therefore, in order to improve the S/N ratio of the acceleration sensor, it is useful to increase a difference between the rotational force applied to the heavyweight section HVU of the mass body MS and the rotational force applied to the lightweight section LTU of the mass body MS.

Secondly, it is conceivable to lower the pressure of the gas sealed in the cavity in which the mass body MS is disposed. This is because lowering the pressure of the gas sealed in the cavity means that the interaction between the mass body MS and the gas can be reduced, thereby suppressing the displacement of the mass body MS due to the acceleration from being attenuated by the viscous resistance based on the gas sealed in the cavity. That is, lowering the pressure of the gas sealed in the cavity means that the displacement of the mass body MS due to the acceleration is not easily disturbed by the gas, thereby ensuring the displacement of the mass body MS. That is, the lower the pressure of the gas sealed in the cavity is, the smaller the resistance force which hinders the displacement of the mass body MS is. Thus, the size of the displacement of the mass body MS corresponding to the minute acceleration can be ensured, which means that the attenuation of the signal corresponding to minute acceleration can be suppressed. Therefore, in order to improve the S/N ratio of the acceleration sensor, it is useful to reduce the interaction between the mass body MS and the gas by lowering the pressure of the gas sealed in the cavity. As described above, in order to improve the S/N ratio of the acceleration sensor, it is useful to increase the difference between the rotational force applied to the heavyweight section HVU of the mass body MS and the rotational force applied to the lightweight section LTU of the mass body MS, and it is useful to reduce the interaction between the mass body MS and the gas by lowering the pressure of the gas sealed in the cavity. In particular, in order to improve the S/N ratio of the acceleration sensor, the present inventor performs detailed examination as described below focusing on the viewpoint of reducing the interaction between the mass body MS and the gas, so this point will be explained.

For example, in the related art, as shown in FIG. 3, through-holes TH are provided in the mass body MS. Thus, when the mass body MS is displaced due to the acceleration, the mass body MS is less likely to receive resistance from the gas sealed in the cavity. Specifically, FIGS. 4(a) and 4(b) are schematic diagrams for explaining that the mass body MS is less likely to receive resistance from gas, by providing through-holes in the mass body. In FIG. 4(a), a fixed electrode FEL and a mass body MS facing the fixed electrode FEL are disposed in the cavity CAV, and the gas molecule GM is sealed inside the cavity CAV. The mass body MS is provided with a through-hole TH, and the mass body MS is configured to be displaceable in the direction of the arrow in FIG. 4(a). At this time, for example, a case is considered where the mass body MS is displaced due to acceleration applied to the mass body MS. FIG. 4(b) is a schematic diagram showing a state in which the mass body MS is displaced so as to approach the fixed electrode FEL from the state shown in FIG. 4(a). As shown in FIG. 4(b), in a case where the mass body MS is displaced, since the through-hole TH is provided in the mass body MS, the gas molecule GM can move through the through-hole TH. In this way, the through-hole TH provided in the mass body MS functions as a path for the gas molecule GM, so that when the mass body MS is displaced, the mass body MS is less likely to receive resistance from the gas molecule GM, and can smoothly be displaced. That is, from the viewpoint of reducing the interaction between the mass body MS and the gas, it is understood that the configuration is useful in which the through-hole TH is provided in the mass body MS.

However, even if the through-hole TH is provided in the mass body MS, there is an interaction between the mass body MS and the gas molecule GM, and mechanical noise (Brownian noise) is generated by the interaction between the mass body MS and the gas molecule GM. In other words, from the viewpoint of improving the S/N ratio of the acceleration sensor, it is useful to provide the through-hole TH in the mass body MS, but considering the mechanical noise generated by the interaction between the mass body MS and the gas molecule GM, if the mechanical noise can be reduced, it is possible to further improve the S/N ratio of the acceleration sensor. Therefore, the present inventor first examined the mechanism of generation of mechanical noise by the interaction between the mass body MS and the gas molecule GM. As a result, the present inventor found new knowledge about the mechanism by which mechanical noise is generated by the interaction between the mass body MS and the gas molecule GM, so a new finding discovered by the inventor of the present invention will be described below.

<New Knowledge Found by the Present Inventor>

FIG. 5 is a schematic diagram for explaining a mechanism by which mechanical noise is generated by the interaction between the mass body and the gas molecules. In FIG. 5, when the gas molecule GM collides with the mass body MS, the gas molecule GM does not bounce but adheres to the surface of the mass body MS. Then, the gas molecule GM adhered to the surface of the mass body MS moves while rubbing the surface of the mass body MS and passes through the through-hole TH provided in the mass body MS. At this time, according to the examination by the present inventor, it was found that mechanical noise is generated due to vibration and the like when the gas molecule GM moves while rubbing the surface of the mass body MS. That is, the present inventor newly found that the movement of the gas molecule GM while rubbing the surface of the mass body MS is a noise source of mechanical noise. That is, the new knowledge found by the present inventor is that the phenomenon that the gas molecule GM adhered to the surface of the mass body MS moves while rubbing the surface of the mass body MS is a noise source of mechanical noise. Therefore, based on the new finding discovered by the present inventor, as shown in FIG. 5, when a distance W that the gas molecule GM moves while rubbing the surface of the mass body MS becomes longer, the mechanical noise increases. From this, if the distance W that the gas molecule GM moves while rubbing the surface of the mass body MS can be shortened, it is possible to reduce the mechanical noise, thereby improving the S/N ratio of the acceleration sensor. Therefore, on the premise of providing the through-hole TH in the mass body MS, the present inventor examined a layout configuration of the through-hole TH in which the distance W the gas molecule GM moves while rubbing the surface of the mass body MS can be shortened as much as possible, so the results of this study will be described below.

<Examination by the Present Inventor>

FIG. 6 is a schematic diagram showing the layout configuration of the through-holes in Examination Example 1 examined by the present inventor, FIG. 6(a) corresponds to a plan view, and FIG. 6(b) corresponds to a cross-sectional view taken along line A-A of FIG. 6(a). As shown in FIG. 6(a) and FIG. 6(b), in Examination Example 1 examined by the present inventor, a through-hole TH(A) having a relatively large rectangular shape is formed in the mass body MS. In the configuration of Examination Example 1, the area occupied by the plurality of through-holes TH(A) in the surface area of the mass body MS can be increased, and as a result, the distance that the gas molecule GM moves while rubbing the surface of the mass body MS until it reaches the through-hole TH(A) can be shortened. Therefore, in the configuration of Examination Example 1, it is considered that it is possible to reduce the mechanical noise caused by the gas molecule GM moving while rubbing the surface of the mass body MS, thereby improving the S/N ratio of the acceleration sensor. However, in the configuration of Examination Example 1, the area occupied by the plurality of through-holes TH(A) is increased, and as a result, the area of the surface electrode (movable electrode) of the mass body MS is reduced. That is, as shown in FIG. 4(a) and FIG. 4(b), the mass body MS also has a function as a movable electrode facing the fixed electrode FEL, for example. Then, the acceleration is detected by the change in the capacitance of the capacitive element configured with the fixed electrode FEL and the mass body MS (movable electrode). Therefore, from the viewpoint of increasing the detection signal (signal) of the acceleration, it is desirable that the change in the capacitance of the capacitive element is large, and the electrode area of the capacitive element needs to be increased in order to increase the change in the capacitance of the capacitive element. That is, from the viewpoint of increasing the detection signal (signal), it is desirable to increase the area of the surface electrode (movable electrode) of the mass body MS. Regarding this point, in the configuration of Examination Example 1, the distance that the gas molecule GM moves while rubbing the surface of the mass body MS until it reaches the through-hole TH(A) can be shortened, whereas the area of the surface electrode of the mass body MS becomes smaller. That is, in the configuration of Examination Example 1, although it is possible to reduce the mechanical noise caused by the gas molecule GM moving while rubbing the surface of the mass body MS until it reaches the through-hole TH (A), the detection signal (signal) based on the change in the capacitance of the capacitive element becomes small. This means that although the noise component can be reduced in Examination Example 1, it is difficult to greatly improve the S/N ratio as a result of the signal component becoming smaller.

Therefore, a layout configuration of the through-holes in Examination Example 2 described below is considered. FIG. 7 is a schematic diagram showing the layout configuration of the through-holes in Examination Example 2 examined by the present inventor, FIG. 7(a) corresponds to a plan view, and FIG. 7(b) corresponds to a cross-sectional view taken along line A-A of FIG. 7(a). As shown in FIG. 7(a) and FIG. 7(b), in Examination Example 2 examined by the present inventor, a plurality of through-holes TH(B) of a smaller size than that of the through-holes TH(A) of Examination Example 1 shown in FIG. 6(a) are formed in the mass body MS. Thus, also in Examination Example 2 examined by the present inventor, it is possible to shorten the distance that the gas molecule GM moves while rubbing the surface of the mass body MS until it reaches the through-hole TH(B). Furthermore, in Examination Example 2, the area occupied by the plurality of through-holes TH(B) can be made smaller than that of Examination Example 1, so that in Examination Example 2, the area of the surface electrode (movable electrode) of the mass body MS can be made larger than that of Examination Example 1. Thus, according to Examination Example 2, mechanical noise can be reduced as compared with Examination Example 1, and a detection signal (signal) based on a change in capacitance of the capacitive element can also be increased. From this, in the configuration of Examination Example 2, the noise component can be reduced and the signal component can be made larger than that of Examination Example 1, so that it is possible to improve the S/N ratio more than Examination Example 1.

Further, FIG. 8 is a schematic diagram showing the layout configuration of the through-holes in Examination Example 3 examined by the present inventor, FIG. 8(a) corresponds to a plan view, and FIG. 8(b) corresponds to a cross-sectional view taken along line A-A of FIG. 8(a). As shown in FIG. 8(a) and FIG. 8(b), in Examination Example 3 examined by the present inventor, a plurality of through-holes TH(C) of a much smaller size than that of the through-holes TH(B) of Examination Example 2 shown in FIG. 7(a) are formed in the mass body MS. Thus, also in Examination Example 3 examined by the present inventor, it is possible to further shorten the distance that the gas molecule GM moves while rubbing the surface of the mass body MS until it reaches the through-hole TH(B). In Examination Example 3, the area occupied by the plurality of through-holes TH(C) is the same as in Examination Example 2, and in Examination Example 3, it is possible to have the same area of the surface electrode (movable electrode) of the mass body MS as that of Examination Example 2. Thus, according to Examination Example 3, it can be considered that mechanical noise can be reduced as compared with Examination Example 2, and a detection signal (signal) based on a change in capacitance of the capacitive element can also be increased. However, in practice, the mechanical noises cannot be reduced in the configuration of Examination Example 3, as compared with the Examination Example 2. The reason will be described below.

As shown in FIG. 8(a), in Examination Example 3 examined by the present inventor, a plurality of through-holes TH(C) of a much smaller size than that of the through-holes TH(B) of Examination Example 2 shown in FIG. 7(a) are formed. For this reason, at a glance, in Examination Example 3, as compared with Examination Example 2, it is possible to shorten the distance that the gas molecule GM moves while rubbing the surface of the mass body MS until it reaches the through-hole TH(B) while ensuring the area of the surface electrode of the mass body MS, so it is considered that the S/N ratio can be improved. However, in Examination Example 3, as a result of forming the through-holes TH(C) of a small size, as shown in FIG. 8(b), the through length is relatively longer than the size of the through-hole TH(C). This means that the aspect ratio (through length/width) of the through-hole TH(C) is increased according to the configuration of Examination Example 3. In this case, gas molecules hardly pass through the through-holes TH(C). That is, as in Examination Example 3, when the aspect ratio of the through-hole TH(C) is increased, the conductance showing the ease of passing through the gas molecule is reduced. In other words, as in Examination Example 3, as the aspect ratio of the through-hole TH(C) increases, the viscous resistance increases. In this manner, in Examination Example 3, by reducing the planar size of the through-hole TH(C), the distance that the gas molecules move while rubbing the surface of the mass body MS while securing the electrode area of the mass body MS can be shortened, whereas the conductance decreases by increasing the aspect ratio of the through-hole TH(C). The decrease in the conductance means that the gas molecules are less likely to pass through the through-hole TH(C), which means that the interaction between the gas molecules and the mass body MS increases. Therefore, in Examination Example 3, the interaction between the gas molecules and the mass body MS increases due to the decrease in the conductance by increasing the aspect ratio of the through-hole TH(C), and as a result, the mechanical noise increases.

FIG. 9 is a graph showing a relationship between the length (depth) of the through-hole and viscous resistance in a case where the diameter and pitch of the through-hole (the numerals in FIG. 9 indicate the diameter/pitch) are changed, with the electrode area fixed at 75%. As shown in FIG. 9, in a case where the length of the through-hole is sufficiently short (<160 μm), it is understood that as the diameter and the pitch of the through-hole become smaller, the viscous resistance decreases. That is, it is understood that the knowledge found by the present inventor is supported, that is, the viscous resistance decreases and the mechanical noise decreases by shortening the distance that the gas molecules move while rubbing the surface of the mass body by reducing the diameter and pitch of the through-hole. On the other hand, when the length of the through-hole exceeds 160 μm, the viscous resistance becomes smaller in the case of the configuration in which the diameter of the through-hole is 30 μm rather than in the configuration in which the diameter of the through-hole is 15 μm. Furthermore, when the length of the through-hole exceeds 800 μm, the viscous resistance becomes smaller in the case of the configuration in which the diameter of the through-hole is 45 μm rather than in the configuration in which the diameter of the through-hole is 30 μm. This viscous resistance reversal phenomenon can be understood by considering the interaction with the gas molecules in each of the surface of the mass body and inside of the through-hole. That is, on the surface of the mass body, the smaller the distance that the gas molecules move while rubbing the surface of the mass body, the smaller the interaction between the mass body and the gas molecules. Therefore, the smaller the diameter and the pitch of the through-hole, the smaller the interaction between the mass body and the gas molecule on the surface of the mass body. In contrast, in the inside of the through-hole, as the diameter of the through-hole is small and the length of the through-hole is long, the conductance decreases and the interaction between the mass body and the gas molecules increases. From this, in the case where the diameter and the pitch of the through-hole are small and the length of the through-hole is short, the influence of the decrease in conductance is small and the distance that the gas molecules move while rubbing the surface of the mass body on the surface of the mass body can be shortened, the interaction between the mass body and the gas molecules is reduced as a whole, and as a result, the viscous resistance is reduced. However, even if the diameter and the pitch of the through-hole are small, if the length of the through-hole increases, the influence of a decrease in the conductance increases, so the interaction between the mass body and the gas molecules becomes large as a whole, and as a result, the viscous resistance increases. For this reason, the viscous resistance reversal phenomenon shown in FIG. 9 occurs. Therefore, for example, since the length of the through-hole provided in the mass body becomes long in a case of increasing the mass by increasing the thickness of the mass body in order to improve the S/N ratio, from the result shown in FIG. 9, it is understood that in order to improve the S/N ratio, it is necessary to consider not only the diameter and the pitch of the through-hole but also the conductance due to the length of the through-hole.

From the above, it is possible to know the following on the basis of the examination result of the present inventor. That is, according to the knowledge found by the present inventor, in order to improve the S/N ratio of the acceleration sensor, the configuration is useful in which the distance that the gas molecules move while rubbing the surface of the mass body is shortened while securing the electrode area of the mass body. This configuration can be realized by providing the plurality of through-holes with a small planar size in the mass body. However, according to the examination found by the present inventor, if the planar size of the through-hole is made too small, the conductance becomes small due to the increase in the aspect ratio of the through-hole, the mechanical noise increases, and the S/N ratio cannot be improved.

In particular, in order to improve the S/N ratio, it is useful to increase the mass of the mass body, but increasing the mass of the mass body means that the mass body becomes thicker, which means that when the planar size of the through-hole is reduced, the aspect ratio of the through-hole tends to be high. In this way, in order to improve the S/N ratio of the acceleration sensor, it is necessary not only to consider shortening the distance that the gas molecules move while rubbing the surface of the mass body while securing the electrode area of the mass body but also consider the influence of an increase in mechanical noise based on a decrease in conductance caused by an increase in the aspect ratio of the through-hole. There is a trade-off relationship between shortening the distance that the gas molecules move while rubbing the surface of the mass body while securing the electrode area of the mass body and suppressing the decrease in the conductance in the through-hole. From this, it is necessary to study for shortening the distance that the gas molecules move while rubbing the surface of the mass body while securing the electrode area of the mass body and suppressing the decrease in the conductance at the through-hole. Therefore, in the present embodiment, study is performed for improving the S/N ratio of the acceleration sensor. Specifically, in the present embodiment, study is performed for shortening the distance that the gas molecules move while rubbing the surface of the mass body while securing the electrode area of the mass body and suppressing the decrease in the conductance at the through-hole. Hereinafter, the technical idea of the present embodiment which has been studied will be described.

<Configuration of Sensor Element of the Present Embodiment>

FIG. 10 is a plan view illustrating an example of a configuration of a sensor element SE in the present embodiment. In FIG. 10, the sensor element SE in the present embodiment has a frame FR and a mass body MS which is disposed in a cavity CAV provided inside the frame FR. A large opening portion is formed in the vicinity of the center portion of the mass body MS, and a fixing portion FU is disposed so as to be included in the opening portion. The mass body MS and the fixing portion FU are mechanically connected by a pair of beams BM. More specifically, assuming that a line passing through the center of the fixing portion FU and extending in the y-direction is an imaginary line AX1, a beam BM extending along the imaginary line AX1 is provided. In this case, a part located on the right side of the imaginary line AX1 in the mass body MS is a heavyweight section HVU, and a part located on the left side of the imaginary line AX1 in the mass body MS is a lightweight section LTU. As shown in FIG. 10, in the sensor element SE in the present embodiment, a value obtained by multiplying a distance L1 in the x-direction between the imaginary line AX1 and the center of gravity CG1 of the heavyweight section HVU by the mass of the heavyweight section HVU is larger than a value obtained by multiplying a distance L2 in the x-direction between the imaginary line AX1 and the center of gravity CG2 of the lightweight section LTU by the mass of the lightweight section LTU. This makes a configuration of a sensor element SE having a seesaw structure.

Further, in the sensor element SE in the present embodiment, as shown in FIG. 10, a plurality of opening portions OP1 indicated by solid lines are formed on the surface side of the heavyweight section HVU of mass body MS, and a plurality of opening portions OP2 indicated by broken lines are formed on the back side of the heavyweight section HVU of mass body MS. At this time, in plan view, at least the planar size of each of the plurality of opening portions OP2 is larger than the planar size of each of the plurality of opening portions OP1. The opening portion OP1 and the opening portion OP2 communicate with each other, and a through portion penetrating the heavyweight section HVU of the mass body MS is formed by the opening portion OP1 and the opening portion OP2. Similarly, in the sensor element SE in the present embodiment, as shown in FIG. 10, a plurality of opening portions OP3 indicated by solid lines are formed on the surface side of the lightweight section LTU of mass body MS, and a plurality of opening portions OP4 indicated by broken lines are formed on the back side of the lightweight section LTU of mass body MS. At this time, in plan view, at least the planar size of each of the plurality of opening portions OP4 is larger than the planar size of each of the plurality of opening portions OP3. The opening portion OP3 and the opening portion OP4 communicate with each other, and a through portion penetrating the lightweight section LTU of the mass body MS is formed by the opening portion OP3 and the opening portion OP4. Here, the planar size of the opening portion OP1 formed on the surface side of the heavyweight section HVU is equal to the planar size of the opening portion OP3 formed on the surface side of the lightweight section LTU. On the other hand, the planar size of the opening portion OP2 formed on the back side of the heavyweight section HVU is smaller than the planar size of the opening portion OP4 formed on the back side of the lightweight section LTU. In other words, the planar size of the opening portion OP4 formed on the back side of the lightweight section LTU is larger than the planar size of the opening portion OP2 formed on the back side of the heavyweight section HVU.

Next, as shown in FIG. 10, the beam BM extends in the y-direction, one end in the y-direction of the beam BM is connected to the fixing portion FU, while the other end in the y-direction of the beam BM Is connected to the mass body MS. The beam BM configured in this way is configured so that the end on the mass body MS side can be twisted with respect to the end on the fixing portion FU side by elastic deformation. As a result, when acceleration is applied in the z-direction, a twist (elastic deformation) of the beam BM occurs, and due to the twist of the beam BM, the mass body MS is rotationally displaced about the imaginary line AX1 as a rotation axis. That is, the sensor element SE in the present embodiment has a seesaw structure in which the mass body MS is rotationally displaced about the imaginary line AX1 corresponding to the acceleration in the z-direction.

Subsequently, FIG. 11 is a cross-sectional view taken along line A-A of FIG. 10. As shown in FIG. 11, the sensor element SE in the present embodiment has, for example, a base BS made of silicon, a membrane layer (substrate) ML made of silicon, and a cap CAP made of silicon. Specifically, a concave portion is formed in the base BS, and an insulating film made of, for example, a silicon oxide film is formed on the surface of the base BS on which the concave portion is formed. Then, a membrane layer ML is disposed on the base BS on which the concave portion is formed. Therefore, as shown in FIG. 11, a gap corresponding to a concave portion formed in the base BS is interposed between the base BS and the membrane layer ML, and a connecting portion between the base BS and the membrane layer ML is electrically insulated by an insulating film formed on the surface of the base BS.

On the other hand, as shown in FIG. 11, a cap CAP having a concave portion is disposed on the membrane layer ML. From this, in the sensor element SE in the present embodiment, a cavity CAV is formed by the concave portion formed in the base BS and the concave portion formed in the cap CAP. The membrane layer ML is disposed in the cavity CAV and then is disposed so as to be interposed between the base BS and the cap CAP.

as shown in FIG. 11, a fixing portion (see FIG. 10), a mass body MS, and a beam BM mechanically connecting the fixing portion and the mass body MS are formed on the membrane layer ML. The mass body MS is configured to be displaceable in the z-direction, and the mass body MS includes a heavyweight section HVU disposed on the right side of the beam BM and a lightweight section LTU disposed on the left side of the beam BM. A fixed electrode FEL1 is formed on the surface of the cap CAP facing the heavyweight section HVU, and a fixed electrode FEL2 is formed on the surface of the cap CAP facing the lightweight section LTU. At this time, the size (area) of the fixed electrode FEL1 is the same as the size (area) of the fixed electrode FEL2. In the sensor element SE in the present embodiment, a first capacitive element (first capacitance) is formed by the heavyweight section HVU of the mass body MS and the fixed electrode FEL1, and a second capacitive element (second capacitance) is formed by the lightweight section LTU of the mass body MS and the fixed electrode FEL2. In each of the first capacitive element and the second capacitive element, when the mass body MS constituting the sensor element SE is displaced in the z-direction, the capacitance changes. That is, the sensor element SE in the present embodiment can capture the displacement of the mass body MS as a change in capacitance. That is, the acceleration sensor in the present embodiment is configured such that the mass body MS performs a see-saw action (displacement in the z-direction) due to the acceleration in the z-direction, and the displacement in the z-direction of the mass body MS can be captured as a change in the capacitance of the first capacitive element and a change in the capacitance of the second capacitive element.

Here, in the sensor element SE in the present embodiment, in order to realize a seesaw structure, the mass of the heavyweight section HVU of the mass body MS is different from the mass of the lightweight section LTU of the mass body MS. Specifically, as shown in FIG. 10, the imaginary line AX1 which is the boundary line between the heavyweight section HVU and the lightweight section LTU is shifted toward the lightweight section LTU side from the center line in the x-direction of the mass body MS. That is, the fixing portion FU and the beam BM located on the imaginary line AX1 are shifted toward the lightweight section LTU from the center line in the x-direction of the mass body MS. As a result, in the sensor element SE in the present embodiment, the mass of the lightweight section LTU can be further reduced than the mass of the heavyweight section HVU.

In FIG. 11, among the surfaces constituting the membrane layer ML, the surface facing the fixed electrode FEL1 and the fixed electrode FEL2 formed on the cap CAP is defined as the surface SUR1, the surface on the opposite side of the surface SUR1 is defined as the back surface SUR2. The membrane layer ML in the present embodiment is formed of a laminated structure of a device layer DL and a handle layer (support layer) HL, and the thickness of the device layer DL is thinner than the thickness of the handle layer HL. In other words, the thickness of the handle layer HL is thicker than the thickness of the device layer DL.

Here, as shown in FIG. 11, the heavyweight section HVU of the mass body MS has an overlapping region OLR overlapping the fixed electrode FEL1 and a non-overlapping region NLR not overlapping the fixed electrode FEL1 in plan view. At this time, as shown in FIG. 11, a plurality of opening portions OP1 are formed in a region corresponding to the heavyweight section HVU of the mass body MS, on the surface SUR1 of the membrane layer ML. In other words, a plurality of opening portions OP1 are formed in a region corresponding to the heavyweight section HVU of the mass body MS, on the exposed surface of the device layer DL. On the other hand, a plurality of opening portions OP2 are formed in a region corresponding to the heavyweight section HVU of the mass body MS, on the back surface SUR2 of the membrane layer ML. In other words, a plurality of opening portions OP2 are formed in a region corresponding to the heavyweight section HVU of the mass body MS, on the exposed surface of the handle layer HL. The number of the plurality of opening portions OP1 is larger than the number of the plurality of opening portions OP2, and the opening portions OP1 and the opening portions OP2 communicate with each other to form a through portion penetrating the heavyweight section HVU of the mass body MS. As a specific example, as shown in FIG. 11, one opening portion OP2 corresponds to two opening portions OP1 which are adjacent to each other, and the two opening portions OP1 which are adjacent to each other and one opening portion OP2 form one through portion. As a result, as shown in FIG. 11, the width of the opening portion OP1 is smaller than the width of the opening portion OP2. In other words, it can be said that the width of the opening portion OP2 is larger than the width of the opening portion OP1.

Similarly, as shown in FIG. 11, a plurality of opening portions OP3 are formed in a region corresponding to the lightweight section LTU of the mass body MS, on the surface SUR1 of the membrane layer ML. In other words, a plurality of opening portions OP3 are formed in a region corresponding to the lightweight section LTU of the mass body MS, on the exposed surface of the device layer DL. On the other hand, a plurality of opening portions OP4 are formed in a region corresponding to the lightweight section LTU of the mass body MS, on the back surface SUR2 of the membrane layer ML. In other words, a plurality of opening portions OP4 are formed in a region corresponding to the lightweight section LTU of the mass body MS, on the exposed surface of the handle layer HL. The number of the plurality of opening portions OP3 is larger than the number of the plurality of opening portions OP4, and the opening portions OP3 and the opening portions OP4 communicate with each other to form a through portion penetrating the lightweight section LTU of the mass body MS. As a specific example, as shown in FIG. 11, one opening portion OP4 corresponds to two opening portions OP3 which are adjacent to each other, and the two opening portions OP3 which are adjacent to each other and one opening portion OP4 form one through portion. As a result, as shown in FIG. 11, the width of the opening portion OP3 is smaller than the width of the opening portion OP4. In other words, it can be said that the width of the opening portion OP4 is larger than the width of the opening portion OP3. Focusing on the opening portion OP2 formed on the back surface SUR2 of the heavyweight section HVU and the opening portion OP4 formed on the back surface SUR2 of the lightweight section LTU, the width of the opening portion OP2 is smaller than the width of the opening portion OP4. In other words, the width of the opening portion OP4 is larger than the width of the opening portion OP2. Further, the number of opening portions OP2 is larger than the number of opening portions OP4.

Next, FIG. 12(a) is a partially enlarged plan view schematically showing an array of a plurality of opening portions OP1 and a plurality of opening portions OP2 formed in the heavyweight section HVU of the mass body MS. On the other hand, FIG. 12(b) is a partially enlarged sectional view partially showing the heavyweight section HVU of the mass body MS.

In FIG. 12(a), the plurality of opening portions OP1 are disposed in an array, and are periodically disposed in each of the x-direction and y-direction. Specifically, as shown in FIG. 12(a), the plurality of opening portions OP1 are disposed at "pitch Pxd1" in the x-direction and at "pitch Pyd1" in the y-direction. As shown in FIG. 12(a), the "pitch Pxd1" is defined as the distance between the centers of the opening portions OP1 which are adjacent to each other in the x-direction. Similarly, as shown in FIG. 12(a), the "pitch Pyd1" is defined as the distance between the centers of the opening portions OP1 which are adjacent to each other in the y-direction.

In addition, in FIG. 12(a), a plurality of opening portions OP2 are also disposed in an array and are periodically disposed in each of the x-direction and y-direction. Specifically, as shown in FIG. 12(a), a plurality of opening portions OP2 are disposed at "pitch Pxh1" in the x-direction and at "pitch Pyh1" in the y-direction. Here, as shown in FIG. 12(a), the "pitch Pxh1" is defined as the distance between the centers of the opening portions OP2 which are adjacent to each other in the x-direction. Similarly, as shown in FIG. 12(a), the "pitch Pyh1" is defined as the distance between the centers of the opening portions OP2 which are adjacent to each other in the y-direction.

At this time, as shown in FIG. 12(a), the arrangement period of the plurality of opening portions OP2 in the x-direction is larger than the arrangement period of the plurality of opening portions OP1, and for example, the arrangement period of the plurality of opening portions OP2 is an integral multiple of the arrangement period of the plurality of opening portions OP1. That is, in the present embodiment, "pitch Pxh1" is larger than "pitch Pxd1", and for example, "pitch Pxh1" is an integral multiple of "pitch Pxd1".

Subsequently, in FIG. 12(b), it can be seen that the opening portion OP1 is formed on the surface SUR1 of the membrane layer ML and the opening portion OP2 is formed on the back surface SUR2 of the membrane layer ML. Here, "opening portion OP1" in this specification means a concave portion formed on a flat (flush) surface SUR1, and particularly as shown in FIG. 12(b), "opening portion OP1" in the present embodiment can be regarded as a through-hole penetrating the device layer DL. Similarly, "opening portion OP2" in this specification means a concave portion formed in a flat (flush) rear surface SUR2, and particularly as shown in FIG. 12(b), "opening portion OP2" in the present embodiment can be regarded as a through-hole penetrating the handle layer HL. Note that "opening portion OP1" and "opening portion OP2" in this specification are portions formed on the premise of the flat surface SUR1 and back surface SUR2, and for example, a stepped shape (step shape) cannot be interpreted as "opening portion" and is excluded from the "opening portion" in this specification.

Subsequently, FIG. 13(a) is a partially enlarged plan view schematically showing an array of the plurality of opening portions OP3 and the plurality of opening portions OP4 formed in the lightweight section LTU of the mass body MS. On the other hand, FIG. 13(b) is a partially enlarged sectional view partially showing the lightweight section LTU of the mass body MS.

In FIG. 13(a), the plurality of opening portions OP3 are disposed in an array, and are periodically disposed in each of the x-direction and y-direction. Specifically, as shown in FIG. 13(a), the plurality of opening portions OP3 are disposed at "pitch Pxd2" in the x-direction and at "pitch Pyd2" in the y-direction. Here, as shown in FIG. 13(a), the "pitch Pxd2" is defined as the distance between the centers of the opening portions OP3 which are adjacent to each other in the x-direction. Similarly, as shown in FIG. 13(a), the "pitch Pyd2" is defined as the distance between the centers of the opening portions OP3 which are adjacent to each other in the y-direction.

In addition, in FIG. 13(a), a plurality of opening portions OP4 are also disposed in an array and are periodically disposed in each of the x-direction and y-direction. Specifically, as shown in FIG. 13(a), a plurality of opening portions OP4 are disposed at "pitch Pxh2" in the x-direction and at "pitch Pyh2" in the y-direction. Here, as shown in FIG. 13(a), the "pitch Pxh2" is defined as a distance that the adjacent opening portions OP4 move in parallel and overlap each other in the x-direction. Similarly, as shown in FIG. 13(a), the "pitch Pyh2" is defined as a distance that the adjacent opening portions OP4 move in parallel and overlap each other in the y-direction.

At this time, as shown in FIG. 13(a), the arrangement period of the plurality of opening portions OP4 in the x-direction is larger than the arrangement period of the plurality of opening portions OP3, and for example, the arrangement period of the plurality of opening portions OP4 is an integral multiple of the arrangement period of the plurality of opening portions OP3. That is, in the present embodiment, "pitch Pxh2" is larger than "pitch Pxd2", and for example, "pitch Pxh2" is an integral multiple of "pitch Pxd2".

Subsequently, in FIG. 13(b), it can be seen that the opening portion OP3 is formed on the surface SUR1 of the membrane layer ML and the opening portion OP4 is formed on the back surface SUR2 of the membrane layer ML. Here, "opening portion OP3" in this specification means a concave portion formed on a flat (flush) surface SUR1, and particularly as shown in FIG. 13(b), "opening portion OP3" in the present embodiment can be regarded as a through-hole penetrating the device layer DL. Similarly, "opening portion OP4" in this specification means a concave portion formed in a flat (flush) rear surface SUR2, and particularly as shown in FIG. 13(b), "opening portion OP4" in the present embodiment can be regarded as a through-hole penetrating the handle layer HL. Note that "opening portion OP3" and "opening portion OP4" in this specification are portions formed on the premise of the flat surface SUR1 and back surface SUR2, and for example, a stepped shape (step shape) cannot be interpreted as "opening portion" and is excluded from the "opening portion" in this specification.

<Operation of Acceleration Sensor in Embodiment>

The sensor element SE in the present embodiment is configured as described above. Hereinafter, the operation of the acceleration sensor including the sensor element SE in the present embodiment as a constituent element will be described.

FIG. 14 is a circuit block diagram for explaining the operation of the acceleration sensor in the embodiment. In FIG. 14, an input terminal IN1 and an input terminal IN2 are connected to the sensor element SE. In this case, the variable capacitor VCAP1 connected to the input terminal IN1 corresponds to, for example, a first capacitive element composed of the movable electrode formed of the heavyweight section HVU of the sensor element SE shown in FIG. 11 and fixed electrode FEL1, and the variable capacitor VCAP2 connected to the input terminal IN2 corresponds to, for example, a second capacitive element composed of the movable electrode formed of the lightweight section LTU of the sensor element SE shown in FIG. 11 and the fixed electrode FEL2. A connection node (terminal A) between the variable capacitor VCAP1 and the variable capacitor VCAP2 is connected to the CV conversion unit 10. Specifically, the connection node (intermediate node) (terminal A)

between the variable capacitor VCAP1 and the variable capacitor VCAP2 is connected to the inverting input terminal of the charge amplifier CAMP formed of a single-ended operational amplifier, for example. A fixed potential VB (about 0.6 V) is applied to the non-inverting input terminal of the charge amplifier CAMP. Furthermore, a feedback capacitor Cf is connected between the inverting input terminal of the charge amplifier CAMP and the output terminal of the CV conversion unit 10. An AD conversion unit 11 is connected to the subsequent stage of the CV conversion unit 10, and a synchronous detector 12 is connected to the subsequent stage of the AD conversion unit 11. Further, a low-pass filter (LPF) 13 is connected to the subsequent stage of the synchronous detector 12, and an output terminal OUT is connected to the subsequent stage of the LPF 13. As described above, the circuit blocks of the acceleration sensor in the present embodiment is configured.

First, as shown in FIG. 14, modulation signals with opposite phases different in phase by 180° are applied to the input terminal IN1 and the input terminal IN2. For example, in principle, it is possible to detect the acceleration by detecting the capacitance change in the variable capacitor due to the acceleration without applying the modulation signal. However, since the detection signal based on the capacitance change in the variable capacitor corresponding to the acceleration is a low frequency signal, it is likely to be affected by 1/f noise. That is, in the configuration in which the detection signal based on the capacitance change in the variable capacitor corresponding to the acceleration is used as it is, the 1/f noise becomes large, and as a result, the S/N ratio deteriorates and the detection sensitivity of the acceleration sensor decreases. Therefore, in Embodiment 1, a modulation signal is used. In this case, since the detection signal based on the capacitance change in the variable capacitor corresponding to the acceleration is modulated by a modulation signal to be a high frequency signal, it is less likely to receive 1/f noise. That is, since high frequency signals have 1/f noise smaller than in the low frequency signals, the S/N ratio can be improved, and as a result, the detection sensitivity of the acceleration sensor can be improved. For this reason, in the present embodiment, a modulation signal is applied to the input terminal IN1 and the input terminal IN2.

Subsequently, the reason why modulation signals having opposite phases are applied to the input terminal IN1 and the input terminal IN2 will be described. In FIG. 14, the capacitance of the variable capacitor VCAP1 and the variable capacitor VCAP2 is set to "C". Then, when the acceleration is applied, the heavyweight section HVU of the mass body M is displaced in the +z-direction, the lightweight section LTU of the mass body MS is displaced in the −z-direction, the capacitance of the variable capacitor VCAP1 increases to "C+ΔC", while the capacitance of the variable capacitor VCAP2 decreases to "C−ΔC". In this case, in a case where modulation signals of opposite phases are applied to the input terminal IN1 and the input terminal IN2, charges of Q1=(C+ΔC)V are accumulated in the variable capacitor VCAP1, while charges of Q2=−(C−ΔC)V are accumulated in the variable capacitor VCAP2. Therefore, the charge transfer amount in the combination of the variable capacitor VCAP1 and the variable capacitor VCAP2 is (C+ΔC)V−(C−ΔC)V=2ΔCV. That is, in a case where modulation signals of opposite phases are applied to the input terminal IN1 and the input terminal IN2, the capacitance "C" of the variable capacitor VCAP1 and the capacitance "C" of the variable capacitor VCAP2 are canceled, and the charge transfer amount includes only the component of the capacitance change (ΔC) due to the acceleration. As a result, in the charge transfer amount, the capacitance "C" irrelevant to the capacitance change (ΔC) due to the acceleration is canceled, and as a result, the charge transfer amount corresponding to the capacitance change (ΔC) is taken out, so the detection sensitivity of the acceleration sensor can be improved. For this reason, in the present embodiment, modulation signals having opposite phases are applied to the input terminal IN1 and the input terminal IN2.

Based on the above, the operation of the acceleration sensor in the present embodiment will be described. In FIG. 14, modulation signals with opposite phases different in phase by 180° are applied to the input terminal IN1 and the input terminal IN2. Here, it is assumed that the capacitance of the variable capacitor VCAP1 increases to "C+ΔC" while the capacitance of the variable capacitor VCAP2 decreases to "C−ΔC" by application of acceleration.

As a result, first, if the charge transfer amount in the combination of the variable capacitor VCAP1 and the variable capacitor VCAP2 is (C+ΔC)V−(C−ΔC)V=2ΔCV and the capacitance of the feedback capacitor Cf is set to "Cf", an analog voltage signal indicated by "2ΔCV/Cf" is output from the CV conversion unit 10.

Then, the analog voltage signal is converted into a digital voltage signal by the AD conversion unit 11. Thereafter, the demodulation signal is extracted by the synchronous detector 12. Subsequently, the demodulation signal demodulated by the synchronous detector 12 passes through a low frequency band pass filter (LPF) 14, and finally an acceleration signal (detection signal) corresponding to the acceleration is output from the output terminal OUT.

As described above, according to the acceleration sensor in the present embodiment, the acceleration in the z-direction can be detected. For example, if the z-direction is a vertical direction, an acceleration smaller than the gravitational acceleration used in the reflection elasticwave survey can be detected by the acceleration sensor in the present embodiment.

<Method of Manufacturing a Sensor Element in Embodiment>

Next, a method of manufacturing the sensor element SE in the present embodiment will be briefly described with reference to FIG. 11. In FIG. 11, first, a substrate to be a membrane layer ML including a device layer DL and a handle layer HL having an insulating layer interposed therebetween is prepared. Then, a mass body MS, a beam BM and a fixing portion (not shown) are formed in the membrane layer ML by using, for example, a photolithography technique and an etching technique. Thereafter, by using the photolithography technique and the etching technique, an opening portion OP1 and an opening portion OP3 are formed in the device layer DL by etching from the surface SUR1 side of the membrane layer ML. At this time, the insulating layer interposed between the device layer DL and the handle layer HL functions as an etching stopper. Next, after the cap CAP is bonded to the surface SUR1 side of the membrane layer ML, the handle layer HL is etched from the back surface SUR2 side of the membrane layer ML by using the photolithography technique and the etching technique. Thus, an opening portion OP2 and an opening portion OP4 are formed in the handle layer HL. At this time, the insulating layer interposed between the device layer DL and the handle layer HL functions as an etching stopper. Then, after removing the exposed insulating layer, a base BS is bonded to the back surface SUR2 side of the membrane layer ML. In this way, the sensor element SE in the present embodiment can be manufactured.

<Features in Embodiment>

Subsequently, features of the present embodiment will be described. For example, as shown in FIG. 10, a first feature point of the present embodiment is that the planar size of the opening portion OP2 is larger than the planar size of the opening portion OP1 on the premise that the opening portion OP2 formed on the back surface of the mass body MS and the opening portion OP1 formed on the surface of the mass body MS communicate with each other, in the heavyweight section HVU of the mass body MS. In other words, as shown in FIG. 11, the first feature point of the present embodiment is that the number of the plurality of opening portions OP1 is larger than the number of the plurality of opening portions OP2 on the premise that the opening portion OP2 formed on the back surface of the mass body MS and the opening portion OP1 formed on the surface of the mass body MS communicate with each other, in the heavyweight section HVU of the mass body MS. Thus, as shown in FIG. 11, the width of the opening portion OP1 formed in the device layer DL of the membrane layer ML becomes small and the width of the opening portion OP2 formed in the handle layer HL of the membrane layer ML becomes large. That is, according to the first feature point of the present embodiment, the through portions penetrating the heavyweight section HVU of the mass body MS are configured with the opening portions OP1 and OP2 having different widths which communicate with each other. For example, if the configuration in which the width of the through portion varies depending on the depth of the mass body MS is referred to as "modulation", the first feature point of the present embodiment can be said that the through portion penetrating the heavyweight section HVU of the mass body MS is "modulating". Especially, in a case where the width of the through portion changes "digitally" depending on the depth of the mass body MS as the through portion including the opening portion OP1 and the opening portion OP2 shown in FIG. 11, it can be expressed that the through portion penetrating the heavyweight section HVU of the mass body MS is digitally "modulating".

From the above, according to the present embodiment, the following effects can be obtained. That is, on the surface SUR1 side of the membrane layer ML, a large number of opening portions OP1 with a small planar size are formed, and it is possible to shorten the distance that the gas molecules move while rubbing the surface SUR1 of the mass body MS. This means that the noise source of the mechanical noise can be reduced. Further, the opening portion OP1 having a small planar size is formed in the thin device layer DL in the membrane layer ML. Therefore, it is possible to suppress an increase in the aspect ratio of the opening portion OP1. Therefore, in the opening portion OP1, it is possible to suppress a decrease in the conductance when the gas molecules pass through the opening portion OP1. On the other hand, in the present embodiment, as shown in FIG. 11, on the back surface SUR2 side of the membrane layer ML, the opening portion OP2 having a large planar size is formed. From this, in particular, from the viewpoint of improving the S/N ratio, even if the thickness of the handle layer HL of the membrane layer ML is increased to increase the mass of the heavyweight section HVU of the mass body MS, the planar size of the opening portion OP2 is large, such that it is possible to suppress the increase in the aspect ratio. This means that it is possible to suppress a decrease in conductance when gas molecules pass through the opening portion OP2. Therefore, according to the first feature point of the present embodiment, by forming the opening portion OP1 having a small planar size in the thin device layer DL of the membrane layer ML, it is possible to realize a configuration capable of shortening the distance that the gas molecules move while rubbing the surface SUR1 of the mass body MS. Furthermore, according to the first feature point of the present embodiment, by forming the opening portion OP2 having a large planar size in the thick handle layer HL of the membrane layer ML, it is possible to realize a configuration capable of suppressing a decrease in the conductance when the gas molecules pass through the opening portion OP2. As a result, according to the first feature point of the present embodiment, it is possible to realize a combination of a configuration in which the distance that the gas molecules move while rubbing the surface SUR1 of the mass body MS can be shortened and a configuration in which a decrease in the conductance when the gas molecules pass through the opening portion OP2 can be suppressed, which makes it possible to improve the S/N ratio of the acceleration sensor significantly. Furthermore, according to the first feature point of the present embodiment, even if the thickness of the handle layer HL of the membrane layer ML is increased, it is possible to suppress a decrease in the conductance, so the mass of the heavyweight section HVU of the mass body MS can be increased, thereby increasing the S/N ratio according to the acceleration sensor of the present embodiment as well from this fact. That is, the first feature point of the present embodiment is particularly effective when applied to the configuration in which the thickness of the handle layer HL in the membrane layer ML is increased. Specifically, for example, the straight line indicated by "F" in FIG. 9 represents the configuration of the sensor element SE in the present embodiment. As is apparent from FIG. 9, according to the sensor element SE in the present embodiment, even if the length of the through portion (corresponding to the through-hole in FIG. 9) composed of the combination of the opening portion OP1 and the opening portion OP2 becomes longer, the viscous resistance is the lowest. This means that according to the sensor element SE in the present embodiment, the mechanical noise can be reduced most among the straight lines shown in FIG. 9, and as the mass of the mass body MS is increased, the usefulness of the present embodiment will be enhanced. Therefore, according to the present embodiment, it is possible to greatly improve the S/N ratio that cannot be obtained from a configuration in which a single-sized through-hole is provided in the mass body.

In order to realize the first feature point of the present embodiment, as shown in FIG. 11, the membrane layer ML is formed of a laminated structure of a thin device layer DL and a thick handle layer HL. Thereby, it is possible to form the opening portion OP1 having a small size in the thin device layer DL and to form the opening portion OP2 having a large size in the thick handle layer HL. That is, in the present embodiment, since the through portion penetrating the membrane layer ML is formed by the opening portions OP1 and OP2 having different sizes from each other, the membrane layer ML is formed of a laminated structure of the device layer DL and the handle layer HL. This is because the membrane layer ML is formed of a laminated structure of the device layer DL and the handle layer HL, for example, a plurality of opening portions OP1 are formed by patterning from the surface SUR1 side of the membrane layer ML, while a plurality of opening portions OP2 are formed by patterning from the back surface SUR2 side of the membrane layer ML. In addition, as shown in FIG. 11, an insulating layer is interposed between the device layer DL and the handle layer HL, and the insulating layer functions as an etching stopper for etching from the device layer DL and functions as an etching stopper for etching from the handle layer HL. As described above, the first feature point of Embodiment 1 is that the through portions penetrating the heavyweight section HVU of the mass body MS are configured with the opening portions OP1 and OP2 having different widths and communicating with each other, and in order to realize the first feature point, it can be said that there is also a feature point that the membrane layer ML is configured with the device layer DL, the handle layer HL, and the insulating layer interposed between the device layer DL and the handle layer HL. This is because the configuration of the first feature point can be easily realized by forming the membrane layer ML of a laminated structure of the device layer DL and the handle layer HL with the insulating layer interposed therebetween. That is, it can be said that forming the membrane layer ML of the laminated structure of the device layer DL and the handle layer HL with the insulating layer interposed therebetween has technical significance to easily realize the configuration of the first feature point of the present embodiment.

Subsequently, a second feature point of the present embodiment is that a plurality of opening portions OP4 are formed on the back surface SUR2 of the membrane layer ML, in the lightweight section LTU of the mass body MS, for example, as shown in FIG. 11. For example, as in the related art shown in FIG. 3, it is conceivable to form one large opening portion OP(R) on the back side of the membrane layer ML in the lightweight section LTU of the mass body MS. This is because the lightweight section LTU of the mass body MS is wanted to be made as light as possible, so it is possible to reduce the mass of the lightweight section LTU by forming a large one opening portion OP(R) as in the related art. In this way, in a case of focusing only on reducing the mass of the lightweight section LTU, it is possible to consider that it is desirable to form one large opening portion OP(R) as in the related art shown in FIG. 3. However, in the present embodiment, not only from the viewpoint of reducing the mass of the lightweight section LTU of the mass body MS but also considering the ease of processing the membrane layer ML, as in the present embodiment shown in FIG. 11, it is desirable to form a plurality of opening portions OP4 on the back surface SUR2 of the membrane layer ML.

The reason will be described below. That is, as shown in FIG. 11, in the handle layer HL constituting the membrane layer ML, the opening portion OP2 is formed in the heavyweight section HVU and the opening portion OP4 is formed in the lightweight section LTU. In this case, the opening portion OP2 and the opening portion OP4 are simultaneously formed by patterning the handle layer HL using the photolithography technique and the etching technique. Here, for example, as in the related art shown in FIG. 3, if the size of the through-hole TH formed in the heavyweight section HVU and the size of the opening portion OP(R) formed in the lightweight section LTU are significantly different, the following disadvantage occurs. That is, the etching rate in the etching technique largely depends on the size of the through-hole TH and the opening portion OP(R) to be processed. For example, the etching rate of the large opening portion OP(R) increases while the etching rate of the through-hole TH of a small size decreases. As a result, in a case of etching the through-hole TH and the opening portion OP(R) which are greatly different in size as in the related art, a large difference occurs in the etching rate. Specifically, the etching of the opening portion OP(R) having a larger size proceeds faster than the small-sized through-hole TH. From this, in a case where etching is performed until the etching of the through-hole TH having a small size is completed, over-etching occurs in the opening portion OP(R) having a large size. In particular, in the related art shown in FIG. 3, since there is no layer as an etching stopper for stopping the etching of the opening portion OP(R), when over-etching occurs, the opening portion OP(R) exceeding the depth of a design value is formed, and damage due to over-etching is likely to occur. From this, it can be said that the related art needs to be improved from the viewpoint of ease of processing the membrane layer ML.

Here, even in the present embodiment shown in FIG. 11, from the viewpoint of reducing the mass of the lightweight section LTU, the size of the opening portion OP4 formed in the lightweight section LTU is smaller than the size of the opening portion OP2 formed in the heavyweight section HVU. However, as in the related art shown in FIG. 3, one large opening portion OP(R) is not formed but a plurality of opening portions OP4 are formed in the lightweight section LTU in the present embodiment. From this, the size of the opening portion OP4 formed in the lightweight section LTU in the present embodiment is smaller than the size of one large opening portion OP(R) formed in the lightweight section LTU in the related art. This means that the difference between the size of the opening portion OP4 formed in the lightweight section LTU and the size of the opening portion OP2 formed in the heavyweight section HVU is reduced according to the present embodiment. Therefore, according to the present embodiment, when forming the opening portion OP2 and the opening portion OP4 at the same time in the handle layer HL, the difference in etching rate can be reduced. Therefore, over-etching at the opening portion OP4 formed in the lightweight section LTU is suppressed, and damage caused by over-etching can be suppressed. Furthermore, according to the present embodiment, since the insulating layer functioning as an etching stopper is formed between the device layer DL and the handle layer HL, the design value of the depth of the opening portion OP4 due to over-etching can be prevented. That is, according to the present embodiment, in the lightweight section LTU of the mass body MS, over-etching can be suppressed by the synergistic effect of the second feature point of forming a plurality of opening portions OP4 on the back surface SUR2 of the membrane layer ML and the point of forming the membrane layer ML of the laminated structure with the device layer DL and the handle layer HL having an insulating layer interposed therebetween.

Modification Example 1 (Heavyweight Section)

FIG. 15 is a schematic diagram showing the layout configurations of the opening portion OP1 and the opening portion OP2 formed in the heavyweight section HVU in Modification Example 1. In Modification Example 1 shown in FIG. 15, the "pitch Pxh1" in the x-direction of the opening portion OP2 is set to a value four times the "pitch Pxd1" in the x-direction of the opening portion OP1. On the other hand, the "pitch Pyh1" of the opening portion OP2 in the y-direction is also set to a value twice the "pitch Pyd1" in the y-direction of the opening portion OP1. In this way, even if the pitch ratios in the x-direction and the y-direction are different, substantially the same effect as in Embodiment 1 can be obtained.

Modification Example 2 (Heavyweight Section)

FIG. 16 is a schematic diagram showing the layout configurations of the opening portion OP1 and the opening portion OP2 formed in the heavyweight section HVU in Modification Example 2. In Modification Example 2 shown in FIG. 16, the "pitch Pxh1" in the x-direction of the opening portion OP2 is set to a value twice the "pitch Pxd1" in the x-direction of the opening portion OP1. On the other hand, the "pitch Pyh1" in the y-direction of the opening portion OP2 is set to the same value (1 time) as the "pitch Pyd1" in the y-direction of the opening portion OP1. In this way, even in a case where the pitch ratio is an integral multiple of 2 or more in only one of the x-direction and the y-direction, substantially the same effect as in Embodiment 1 can be obtained.

Modification Example 3 (Heavyweight Section)

FIG. 17 is a schematic diagram showing the layout configurations of the opening portion OP1 and the opening portion OP2 formed in the heavyweight section HVU in Modification Example 3. In Modification Example 3 shown in FIG. 17, the "pitch Pxh1" in the x-direction of the opening portion OP2 is set to a value three times the "pitch Pxd1" in the x-direction of the opening portion OP1. On the other hand, the "pitch Pyh1" in the y-direction of the opening portion OP2 is set to the same value (1 time) as the "pitch Pyd1" in the y-direction of the opening portion OP1. In Modification Example 3, the planar shape of the opening portion OP1 is a square shape, and the planar shape of the opening portion OP2 is a triangular shape. As described above, the planar shape of the opening portion OP1 and the planar shape of the opening portion OP2 are not limited to a square, but even if it is a triangular shape, a rectangular shape, a polygonal shape or a circular shape, substantially the same effect as in Embodiment 1 can be obtained.

Modification Example 4

FIG. 18 is an enlarged sectional view showing a part of the sensor element SE in Modification Example 4 in an enlarged manner. As shown in FIG. 18, in the sensor element SE in Modification Example 4, the membrane layer ML is formed of a three-layer structure of a device layer DL, a handle layer HL1, and a handle layer HL2. In this case, the size of the opening portion 2A formed in the handle layer HL1 is larger than the size of the opening portion OP1 formed in the device layer DL, and the size of the opening portion 2A formed in the handle layer HL1 is larger than the size of the opening portion 2B formed in the handle layer HL2. The opening portion OP1, the opening portion 2A, and the opening portion 2B are in communication with each other, so that a through portion penetrating the membrane layer ML is formed. Even in the sensor element SE in Modification Example 4 configured in this way, substantially the same effects as those in Embodiment 1 can be obtained.

The membrane layer ML in Modification Example 4 can be formed, for example, as in Embodiment 1, by forming the opening portion OP1 and the opening portion OP2 in the laminated structure composed of the device layer and the handle layer HL1, forming the opening portion OP3 in a single layer structure composed of the handle layer HL2 and then bonding the laminated structure and the single layer structure.

Modification Example 5 (Lightweight Section)

FIG. 19 is a schematic diagram showing the layout configuration of the opening portion OP3 and the opening portion OP4 formed in the lightweight section LTU in Modification Example 5. In Modification Example 5 shown in FIG. 19, the "pitch Pxh2" in the x-direction of the opening portion OP4 is set to a value four times the "pitch Pxd2" in the x-direction of the opening portion OP3. On the other hand, the "pitch Pyh2" of the opening portion OP4 in the y-direction is also set to a value twice the "pitch Pyd2" in the y-direction of the opening portion OP3. In this way, even if the pitch ratios in the x-direction and the y-direction are different, substantially the same effect as in Embodiment 1 can be obtained.

Modification Example 6 (Lightweight Section)

FIG. 20 is a schematic diagram showing the layout configuration of the opening portion OP3 and the opening portion OP4 formed in the lightweight section LTU in Modification Example 6. In Modification Example 6 shown in FIG. 20, the "pitch Pxh2" in the x-direction of the opening portion OP4 is set to a value three times the "pitch Pxd2" in the x-direction of the opening portion OP3. On the other hand, the "pitch Pyh2" of the opening portion OP4 in the y-direction is also set to a value twice the "pitch Pyd2" in the y-direction of the opening portion OP3. In this way, even if the pitch ratios in the x-direction and the y-direction are different, substantially the same effect as in Embodiment 1 can be obtained.

Modification Example 7 (Lightweight Section)

FIG. 21 is a schematic diagram showing the layout configuration of the opening portion OP3 and the opening portion OP4 formed in the lightweight section LTU in Modification Example 7. In Modification Example 7 shown in FIG. 21, the "pitch Pxh2" in the x-direction of the opening portion OP4 is set to a value three times the "pitch Pxd2" in the x-direction of the opening portion OP3. On the other hand, the "pitch Pyh2" in the y-direction of the opening portion OP4 is set to the same value (1 time) as the "pitch Pyd2" in the y-direction of the opening portion OP3. In Modification Example 7, the planar shape of the opening portion OP3 is a square shape, and the planar shape of the opening portion OP4 is a polygonal shape. As described above, the planar shape of the opening portion OP1 and the planar shape of the opening portion OP2 are not limited to a square, but even if it is a triangular shape, a rectangular shape, a polygonal shape or a circular shape, substantially the same effect as in Embodiment 1 can be obtained.

<Configuration of Non-Overlapping Region of Heavyweight Section>

For example, as shown in FIG. 11, the heavyweight section HVU of the mass body MS has an overlapping region OLR overlapping the fixed electrode FEL1 in plan and a non-overlapping region NLR not overlapping the fixed electrode FEL1 in plan. That is, the overlapping region OLR is a region that functions as a capacitive element, and the non-overlapping region NLR is a region that does not function as a capacitive element.

Here, for example, the layout configuration of the opening portion OP1 and the opening portion OP2 formed in the overlapping region OLR and the layout configuration of the opening portion OP1 and the opening portion OP2 formed in the non-overlapping region NLR can be the same. Specifically, FIG. 12 is a schematic diagram showing the layout configuration of the opening portion OP1 and the opening portion OP2 formed in the overlapping region OLR. In FIG. 12, the "pitch Pxh1" in the x-direction of the opening portion OP2 is set to a value twice the "pitch Pxd1" in the x-direction of the opening portion OP1. On the other hand, the "pitch Pyh1" of the opening portion OP2 in the y-direction is also set to a value twice the "pitch Pyd1" in the y-direction of the opening portion OP1. Similarly, FIG. 22 is a schematic diagram showing the layout configuration of the opening portion OP1 and the opening portion OP2 formed in the non-overlapping region NLR. In particular, FIG. 22(a) is a plan view, and FIG. 22(b) is a sectional view. In FIG. 22(a), the "pitch Pxh3" in the x-direction of the opening portion OP2 is set to a value twice the "pitch Pxd3" in the x-direction of the opening portion OP1. On the other hand, the "pitch Pyh3" of the opening portion OP2 in the y-direction is also set to a value twice the "pitch Pyd3" in the y-direction of the opening portion OP1. In this way, the overlapping region OLR and the non-overlapping region NLR can be made to have the same layout configuration regardless of the presence or absence of the function of the capacitive element.

Modification Example 8 (Non-Overlapping Region of Heavyweight Section)

For example, in the heavyweight section HVU of the mass body MS, the layout configuration of the opening portion OP1 and the opening portion OP2 formed in the overlapping region OLR and the layout configuration of the opening portion OP1 and the opening portion OP2 formed in the overlapping region OLR can be different. Specifically, FIG. 23 is a schematic diagram showing the layout configuration of the opening portion OP1A and the opening portion OP2 formed in the non-overlapping region NLR. In particular, FIG. 23(a) is a plan view, and FIG. 23(b) is a sectional view. In FIG. 23(a), the "pitch Pxh3" in the x-direction of the opening portion OP2 is set to the same value (1 time) as the "pitch Pxd3" in the x-direction of the opening portion OP1A. Similarly, the "pitch Pyh3" in the y-direction of the opening portion OP2 is set to the same value (1 time) as the "pitch Pyd3" in the y-direction of the opening portion OP1A.

Here, in Modification Example 8, as shown in FIG. 23(a) and FIG. 23(b), the size of the opening portion OP1A is larger than the size of the opening portion OP2. That is, the size of the opening portion OP1A formed in the non-overlapping region NLR on the surface SUR1 of the membrane layer ML is larger than the size of the opening portion OP2 formed in the non-overlapping region NLR on the back surface SUR2 of the membrane layer ML. As can be seen by comparing FIG. 23 with FIG. 12, the size of the opening portion OP1A formed in the non-overlapping region NLR on the surface SUR1 of the membrane layer ML is larger than the planar size of the opening portion OP1 formed in the overlapping region OLR on the front surface SUR1 of the membrane layer ML.

Thus, according to Modification Example 8, in the non-overlapping region NLR, it is possible to shorten the distance that the gas molecules move while rubbing the surface SUR1 of the mass body. That is, unless securing the electrode area is taken into consideration, it is effective to increase the size of the opening portion OP1A, in order to shorten the distance that the gas molecules move while rubbing the surface SUR1 of the mass body. Specifically, FIG. 24 is a graph showing the relationship between the diameter of the opening portion and viscous resistance. As shown in FIG. 24, it can be seen that the viscous resistance decreases, if the diameter of the opening portion increases. Therefore, it can be seen that the configuration of increasing the diameter of the opening portion is an effective configuration from the viewpoint of improving the S/N ratio.

However, since the overlapping region OLR is a region that functions as a capacitive element, it is difficult to increase the size of the opening portion OP1 from the viewpoint of securing the electrode area. On the other hand, since the non-overlapping region NLR is a region that does not function as a capacitive element, the size of the opening portion OP1A can be increased without considering a reduction in electrode area.

As a result, according to Modification Example 8, the size of the opening portion OP1A can be increased, such that in the non-overlapping region NLR, the distance that the gas molecules move while rubbing the surface SUR1 of the mass body can be effectively shortened. Therefore, according to Modification Example 8, it is possible to greatly improve the S/N ratio.

Modification Example 9 (Non-Overlapping Region of Heavyweight Section)

FIG. 25 is a schematic diagram showing the layout configuration of the opening portion OP1B and the opening portion OP2 formed in the non-overlapping region NLR. In particular, FIG. 25(a) is a plan view, and FIG. 25(b) is a sectional view. In FIG. 25(a), the "pitch Pxd3" in the x-direction of the opening portion OP1B is set to a value twice the "pitch Pxh3" in the x-direction of the opening portion OP2. Similarly, the "pitch Pyd3" of the opening portion OP1B in the y-direction is also set to a value twice the "pitch Pyh3" in the y-direction of the opening portion OP2.

Here, in Modification Example 9, as shown in FIG. 25(a) and FIG. 25(b), the size of the opening portion OP1B is larger than the size of the opening portion OP2. That is, the size of the opening portion OP1B formed in the non-overlapping region NLR on the surface SUR1 of the membrane layer ML is larger than the size of the opening portion OP2 formed in the non-overlapping region NLR on the back surface SUR2 of the membrane layer ML. As can be seen by comparing FIG. 25 with FIG. 12, the size of the opening portion OP1B formed in the non-overlapping region NLR on the surface SUR1 of the membrane layer ML is larger than the planar size of the opening portion OP1 formed in the overlapping region OLR on the front surface SUR1 of the membrane layer ML.

In addition, in the Modification Example 9, as can be seen by comparing FIG. 12 with FIG. 25, the period of the opening portion OP1B formed in the non-overlapping region NLR on the surface SUR1 of the membrane layer ML is larger than the period of the opening portion OP1 formed in the overlapping region OLR on the front surface SUR1 of the membrane layer ML. As can be seen from FIG. 25, the period of the opening portion OP1B formed in the non-overlapping region NLR on the surface SUR1 of the membrane layer ML is larger than the period of the opening portion OP2 formed in the non-overlapping region NLR on the back surface SUR2 of the membrane layer ML.

Thus, according to Modification Example 9, the size of the opening portion OP1B can be increased, such that in the non-overlapping region NLR, the distance that the gas molecules move while rubbing the surface SUR1 of the mass body can be effectively shortened. Therefore, according to Modification Example 9, it is possible to greatly improve the S/N ratio.

Hitherto, the invention made by the present inventors has been specifically described based on the embodiments, but the present invention is not limited to the embodiments, and various modifications are possible within a scope without departing from the spirit.

In the above embodiment, an example in which silicon is used as the materials of the base BS, the cap CAP and the membrane layer (substrate) ML has been described. In this case, since silicon is inexpensive and easy to process, it is possible to obtain an advantage that manufacturing cost can be reduced. However, the technical idea of the above embodiment is not limited to this, and it is also possible to use glass, ceramics or metal instead of silicon.

REFERENCE SIGNS LIST

BM BEAM
BS BASE
CAP CAP
CG1 CENTER OF GRAVITY
CG2 CENTER OF GRAVITY
FEL1 FIXED ELECTRODE
FEL2 FIXED ELECTRODE
FU FIXING PORTION
HVU HEAVYWEIGHT SECTION
LTU LIGHTWEIGHT SECTION
ML MEMBRANE LAYER
MS MASS BODY
OP1 OPENING PORTION
OP2 OPENING PORTION
SUR1 SURFACE
SUR2 BACK SURFACE

The invention claimed is:

1. An acceleration sensor comprising:
a substrate;
a fixing portion formed on the substrate;
a mass body that includes a first portion provided on one side of the fixing portion and a second portion provided on the other side of the fixing portion, is formed on the substrate, and is displaceable in a thickness direction of the substrate;
a beam that is formed on the substrate and connects the fixing portion and the mass body to each other;
a first fixed electrode disposed at a position facing the first portion; and
a second fixed electrode disposed at a position facing the second portion,
wherein a first surface of the substrate is a surface facing the first fixed electrode and the second fixed electrode,
wherein a second surface of the substrate is a surface opposite to the first surface,
wherein a value obtained by multiplying a distance between a first center of gravity of the first portion and a center of the fixing portion by a mass of the first portion is greater than a value obtained by multiplying a distance between a second center of gravity of the second portion and a center of the fixing portion by a mass of the second portion,
wherein a first number of first opening portions are formed in a region corresponding to the first portion of the mass body, on the first surface of the substrate,
wherein a second number of second opening portions are formed in a region corresponding to the first portion of the mass body, on the second surface of the substrate,
wherein the first opening portions and the second opening portions overlap each other in a plan view in an arrangement in which each of the second opening portions overlaps four of the first opening portions, and the first and second opening portions are connected to each other to form a plurality of first through portions in the substrate, and
wherein the first number is greater than the second number.

2. The acceleration sensor according to claim 1,
wherein the first number of the first opening portions are disposed in a first period, and
wherein the second number of the second opening portions are disposed in a second period.

3. The acceleration sensor according to claim 2,
wherein the second period is greater than the first period.

4. The acceleration sensor according to claim 3,
wherein the second period is an integral multiple of the first period.

5. The acceleration sensor according to claim 1,
wherein a third number of third opening portions are formed in a region corresponding to the second portion of the mass body, on the first surface of the substrate,
wherein a fourth number of fourth opening portions are formed in a region corresponding to the second portion of the mass body, on the second surface of the substrate,
wherein the third opening portions and the fourth opening portions are connected to each other to form a plurality of second through portions in the substrate, and
wherein the third number is greater than the fourth number.

6. The acceleration sensor according to claim 5,
wherein the second number is greater than the fourth number.

7. The acceleration sensor according to claim 5,
wherein the third number of the third opening portions are disposed in a third period,
wherein the fourth number of the fourth opening portions are disposed in a fourth period, and
wherein the fourth period is greater than the third period.

8. The acceleration sensor according to claim 7,
wherein the first number of the first opening portions are disposed in a first period,
wherein the second number of the second opening portions are disposed in a second period, and
wherein the fourth period is greater than the second period.

9. The acceleration sensor according to claim 1,
wherein in plan view, the first portion of the mass body has an overlapping portion overlapping the first fixed electrode, and a non-overlapping portion not overlapping the first fixed electrode,
wherein a period of the first opening portions formed in a region corresponding to the non-overlapping portion on the first surface of the substrate is larger than a period of the first opening portions formed in a region corresponding to the overlapping portion on the first surface of the substrate, and
wherein a period of the first opening portions formed in a region corresponding to the non-overlapping portion on the first surface of the substrate is larger than a period of the second opening portions formed in a region corresponding to the non-overlapping portion on the second surface of the substrate.

10. An acceleration sensor comprising:
a substrate;
a fixing portion formed on the substrate;
a mass body that includes a first portion provided on one side of the fixing portion and a second portion provided on the other side of the fixing portion, is formed on the substrate, and is displaceable in a thickness direction of the substrate;

a beam that is formed on the substrate and connects the fixing portion and the mass body to each other;

a first fixed electrode disposed at a position facing the first portion; and a second fixed electrode disposed at a position facing the second portion, wherein a first surface of the substrate is a surface facing the first fixed electrode and the second fixed electrode, wherein a second surface of the substrate is a surface opposite to the first surface, wherein a value obtained by multiplying a distance between a first center of gravity of the first portion and a center of the fixing portion by a mass of the first portion is greater than a value obtained by multiplying a distance between a second center of gravity of the second portion and a center of the fixing portion by a mass of the second portion, wherein a plurality of first opening portions are formed in a region corresponding to the first portion of the mass body, on the first surface of the substrate, wherein a plurality of second opening portions are formed in a region corresponding to the first portion of the mass body, on the second surface of the substrate, wherein the plurality of first opening portions and the plurality of second opening portions overlap each other in a plan view in an arrangement in which each of the second opening portions overlaps four of the first opening portions, and the first and second opening portions are connected to each other to form a plurality of first through portions in the substrate, wherein in the plan view, at least, a planar size of some second opening portions among the plurality of second opening portions is larger than a planar size of some first opening portions among the plurality of first opening portions, wherein a plurality of third opening portions are formed in a region corresponding to the second portion of the mass body, on the first surface of the substrate, wherein a plurality of fourth opening portions are formed in a region corresponding to the second portion of the mass body, on the second surface of the substrate, wherein the plurality of third opening portions and the plurality of fourth opening portions are connected to each other to form a plurality of second through portions in the substrate, and wherein in the plan view, a planar size of each of the plurality of fourth opening portions is larger than a planar size of each of the plurality of third opening portions.

11. The acceleration sensor according to claim 10, wherein the planar size of each of the plurality of fourth opening portions is larger than the planar size of each of the plurality of second opening portions.

12. The acceleration sensor according to claim 10, wherein in plan view, the first portion of the mass body has an overlapping portion overlapping the first fixed electrode, and a non-overlapping portion not overlapping the first fixed electrode, and wherein the planar size of the first opening portions formed in a region corresponding to the non-overlapping portion on the first surface of the substrate is larger than the planar size of the first opening portions formed in a region corresponding to the overlapping portion on the first surface of the substrate.

13. The acceleration sensor according to claim 10, wherein in plan view, the first portion of the mass body has an overlapping portion overlapping the first fixed electrode, and a non-overlapping portion not overlapping the first fixed electrode, and wherein the planar size of the first opening portions formed in a region corresponding to the non-overlapping portion on the first surface of the substrate is larger than the planar size of the second opening portions formed in a region corresponding to the non-overlapping portion on the second surface of the substrate.

* * * * *